US012731552B2

(12) United States Patent
Morita et al.

(10) Patent No.: US 12,731,552 B2
(45) Date of Patent: Sep. 8, 2026

(54) DISPLAY DEVICE INCLUDING A TRANSISTOR THAT SUPPLIES CURRENT TO A LIGHT EMITTING ELEMENT BEING PLACED IN ON STATE BEFORE A VOLTAGE IS STORED IN A STORAGE CAPACITOR

(71) Applicant: Magnolia White Corporation, Tokyo (JP)

(72) Inventors: Tetsuo Morita, Tokyo (JP); Kenji Harada, Tokyo (JP)

(73) Assignee: MAGNOLIA WHITE CORPORATION, Tokyo (JP)

( * ) Notice: Subject to any disclaimer, the term of this patent is extended or adjusted under 35 U.S.C. 154(b) by 0 days.

(21) Appl. No.: 18/990,111

(22) Filed: Dec. 20, 2024

(65) Prior Publication Data

US 2025/0209997 A1 Jun. 26, 2025

(30) Foreign Application Priority Data

Dec. 20, 2023 (JP) ................................ 2023-214905

(51) Int. Cl.
*G09G 3/3275* (2016.01)
*G09G 3/3266* (2016.01)

(52) U.S. Cl.
CPC ......... *G09G 3/3275* (2013.01); *G09G 3/3266* (2013.01); *G09G 2300/0842* (2013.01); *G09G 2310/08* (2013.01)

(58) Field of Classification Search
None
See application file for complete search history.

(56) References Cited

U.S. PATENT DOCUMENTS

| | | | | |
|---|---|---|---|---|
| 2010/0295758 A1* | 11/2010 | Kawabe | G09G 3/3233 | 345/76 |
| 2011/0090137 A1* | 4/2011 | Liu | G09G 3/3233 | 345/76 |
| 2012/0001893 A1* | 1/2012 | Jeong | G09G 3/3233 | 345/76 |
| 2016/0148569 A1* | 5/2016 | Park | G09G 3/3233 | 345/212 |
| 2018/0061317 A1 | 3/2018 | Morita et al. | | |
| 2021/0110763 A1* | 4/2021 | Morita | G09G 3/2085 | |
| 2023/0081342 A1* | 3/2023 | Lin | G09G 3/3233 | 345/211 |
| 2024/0355287 A1* | 10/2024 | Tanaka | G09G 3/3233 | |

FOREIGN PATENT DOCUMENTS

| | | | | |
|---|---|---|---|---|
| CN | 106707512 A * | 5/2017 | G02B 27/017 |
| JP | 2018-036290 A | 3/2018 | |
| JP | 2019-211665 A | 12/2019 | |

* cited by examiner

*Primary Examiner* — Kirk W Hermann
(74) *Attorney, Agent, or Firm* — XSENSUS LLP

(57) ABSTRACT

A display device includes a base, pixels provided on the base, and a data signal line that supplies a data signal to each of the pixels. Each of the pixels includes a pixel circuit having a first transistor and a storage capacitor, and a light emitting element driven by the pixel circuit. A voltage that controls the current supplied to the light-emitting element is written to the storage capacitor. The first transistor is configured to supply a current to the light emitting element. One frame period for displaying one frame includes a second period for setting the first transistor in an on state, which is provided before a first period for writing a voltage to the storage capacitor.

4 Claims, 18 Drawing Sheets

DISPLAY DEVICE INCLUDING A TRANSISTOR THAT SUPPLIES CURRENT TO A LIGHT EMITTING ELEMENT BEING PLACED IN ON STATE BEFORE A VOLTAGE IS STORED IN A STORAGE CAPACITOR

CROSS-REFERENCE TO RELATED APPLICATIONS

This application is based upon and claims the benefit of priority from Japanese Patent Application No. 2023-214905, filed Dec. 20, 2023, the entire contents of which are incorporated herein by reference.

FIELD

Embodiments described herein relate generally to a display device.

BACKGROUND

Recently, display devices with organic light emitting diodes (OLED) serving as light emitting elements that function as display elements have been put into practical use.

A light emitting element is driven by a pixel circuit in such a display device, and the display quality of the display device may be degraded depending on a method of driving the light emitting element.

DETAILED DESCRIPTION

Figure 1:
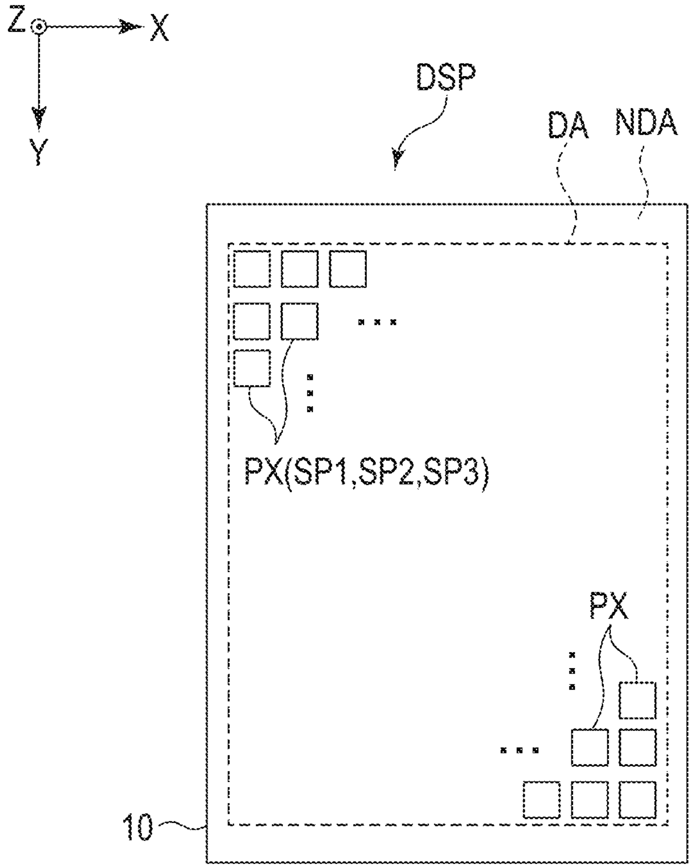
FIG. 1 is a view showing a configuration example of a display device according to a first embodiment.

In general, according to one embodiment, a display device includes a base, a plurality of pixels provided in a display area on the base, and a data signal line that supplies a data signal to each of the plurality of pixels. Each of the plurality of pixels includes a pixel circuit having a first transistor and a storage capacitor, and a light emitting element driven by the pixel circuit. A voltage that controls a current supplied to the light emitting element is written to the storage capacitor. The first transistor is configured to supply a current to the light emitting element, based on the voltage written to the storage capacitor. One frame period for displaying one frame in the display area includes a second period for setting the first transistor in an on state, which is provided before a first period for writing a voltage corresponding to the data signal to the storage capacitor.

An embodiment will be described hereinafter with reference to the accompanying drawings.

The disclosure is merely an example, and proper changes within the spirit of the invention, which are easily conceivable by a person of ordinary skill in the art, are included in the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. However, such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

In the figures, an X-axis, a Y-axis and a Z-axis orthogonal to each other are described to facilitate understanding as needed. A direction along the X-axis is referred to as a first direction X, a direction along the Y-axis is referred to as a second direction Y, and a direction along the Z-axis is referred to as a third direction Z. Viewing various elements parallel to the third direction Z is referred to as plan view.

The display device according to the embodiment is an organic electroluminescent display device including organic light emitting diodes (OLED) as display elements (light emitting elements), and is mounted on televisions, personal computers, mobile terminals, mobile phones, and the like.

First Embodiment

First, a first embodiment will be described. FIG. 1 is a view showing a configuration example of a display device DSP according to the embodiment. The display device DSP has a display area DA where images are displayed and a non-display area NDA around the display area DA, on an insulating base 10. The base 10 may be glass or a flexible resin film.

In the embodiment, the shape of the base 10 in plan view is a rectangular shape. However, the shape of the base 10 in plan view is not limited to a rectangular shape, but may also be other shape such as a square, a circle or an ellipse.

The display area DA includes a plurality of pixels PX arrayed in a matrix in the first direction X and the second direction Y that intersect each other. Each of the pixels PX includes a plurality of subpixels SP. In one example, the plurality of subpixels SP include a red subpixel SP1, a green subpixel SP2, and a blue subpixel SP3. Incidentally, the plurality of subpixels SP may include a subpixel SP of the other color such as white, together with the subpixels SP1, SP2, and SP3. Alternatively, the plurality of subpixels SP may include a subpixel SP of the other color instead of any one of the subpixels SP1, SP2, and SP3.

Incidentally, although described below in detail, each of the plurality of subpixels SP includes a pixel circuit and a light emitting element driven by the pixel circuit. The pixel circuit is composed of, for example, a plurality of transistors (switching elements composed of thin film transistors), and the like. The light emitting element is the above-described organic light emitting diode. For example, the subpixel SP1 includes a light emitting element that emits light so as to emit light of a red wavelength range, the subpixel SP2 includes a light emitting element that emits light of so as to emit light of a green wavelength range, and the subpixel SP3 includes a light emitting element that emits light so as to emit light of a blue wavelength range.

Figure 2:
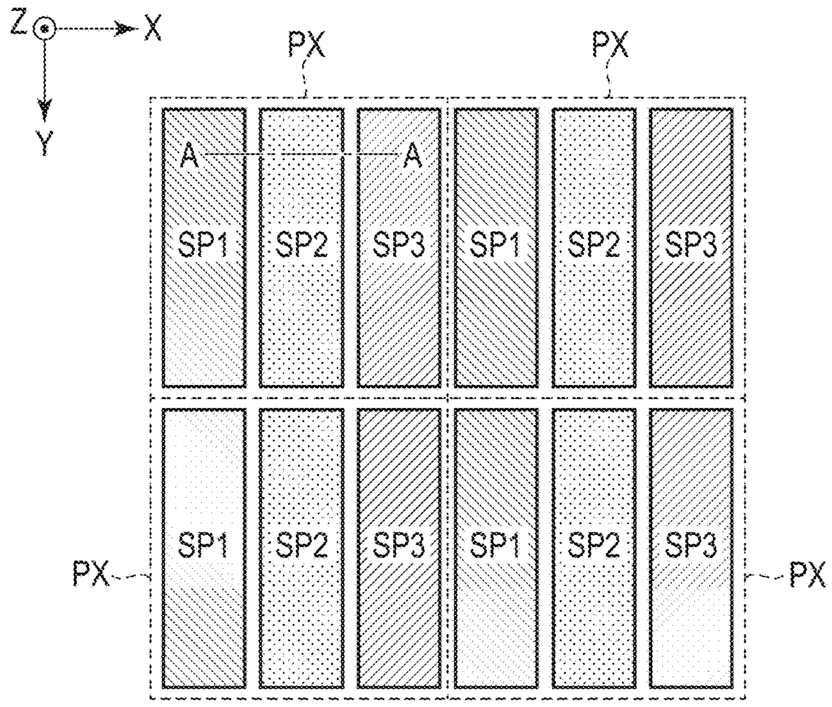
FIG. 2 is a view showing an example of a layout of a plurality of subpixels included in a pixel.

FIG. 2 shows an example of a layout of the plurality of subpixels SP (SP1, SP2 and SP3) included in the pixel PX. In this example, four pixels PX will be focused.

Each of the subpixels SP1, SP2, and SP3 constituting one pixel PX is formed in a substantially rectangular shape extending in the second direction Y, and the subpixels are arranged in the first direction X. When two pixels PX arranged in the first direction X are focused, colors displayed in the subpixels SP adjacent in the first direction X are different from each other. In addition, when two pixels PX arranged in the second direction Y are focused, colors displayed in the subpixels SP adjacent in the second direction Y are the same as each other. Incidentally, area of the subpixels SP1, SP2, and SP3 may be the same as each other or different from each other.

Figure 3:
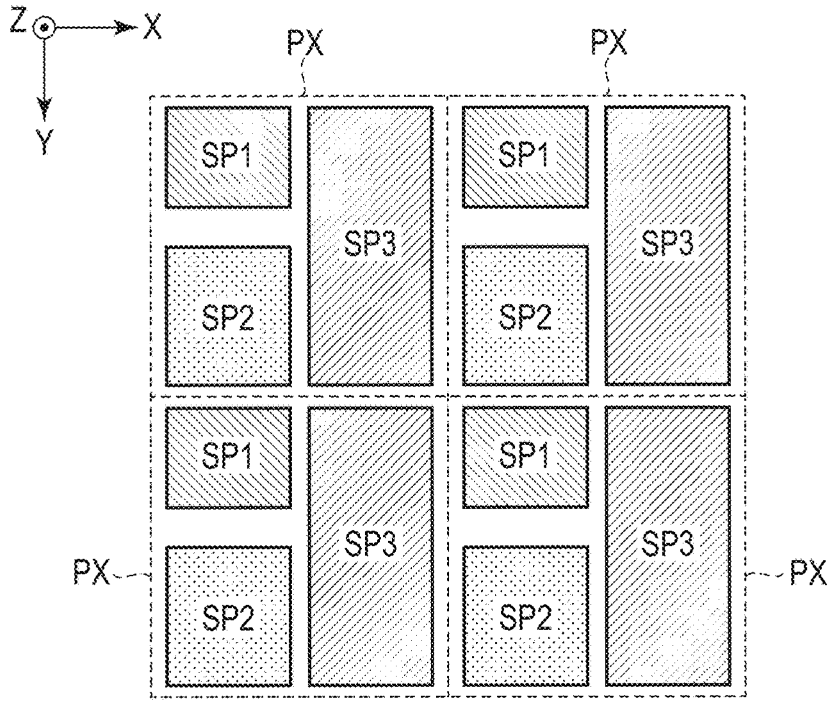
FIG. 3 is a view showing another example of the layout of a plurality of subpixels included in a pixel.

FIG. 3 shows another example of the layout of the plurality of subpixels SP (SP1, SP2 and SP3) included in the pixel PX.

The subpixels SP1 and SP2 constituting one pixel PX are arranged in the second direction Y, the subpixels SP1 and SP3 are arranged in the first direction X, and the subpixels SP2 and SP3 are arranged in the first direction X. The subpixel SP1 is formed in a substantially rectangular shape extending in the first direction X, and the subpixels SP2 and SP3 are formed in a substantially rectangular shape extending in the second direction Y. The area of the subpixel SP2 is larger than the area of the subpixel SP1, and the area of the subpixel SP3 is larger than the area of the subpixel SP2. Incidentally, the shape and area of the subpixel SP1 may be the same as those of the subpixel SP2.

When two pixels PX arranged in the first direction X are focused, the displayed colors are different from each other in the area where the subpixels SP1 and SP3 are alternately provided and the area where subpixels SP2 and SP3 are alternately provided. In contrast, when two pixels PX arranged in the second direction Y are focused, the colors displayed in the subpixels SP adjacent in the second direction Y are different from each other in the area where the subpixels SP1 and SP2 are alternately provided. In addition, the colors displayed in the subpixels SP adjacent in the second direction are the same as each other in the area where a plurality of subpixels SP3 are arranged.

Incidentally, an outer shape of the subpixels SP1, SP2, and SP3 shown in FIG. 2 and FIG. 3 corresponds to an outer shape of the area (i.e., the light emission area) where the colors are displayed in the subpixels SP and are simplified, and does not reflect the actual shape.

Although described later in detail, a rib and a partition are provided in the display area DA of the embodiment. The rib includes an aperture in each of the subpixels SP1, SP2, and SP3. The partition is provided on a boundary between adjacent subpixels SP and overlaps with the rib in plan view. More specifically, the partition is provided between the apertures (subpixels SP) adjacent in the first direction X and between the apertures (subpixels SP) adjacent in the second direction Y. As a result, the partition has a grating shape formed to divide the subpixels SP1, SP2, and SP3 as a whole. In other words, the partition is considered to include apertures in the subpixels SP1, SP2, and SP3, similarly to the rib.

Figure 4:
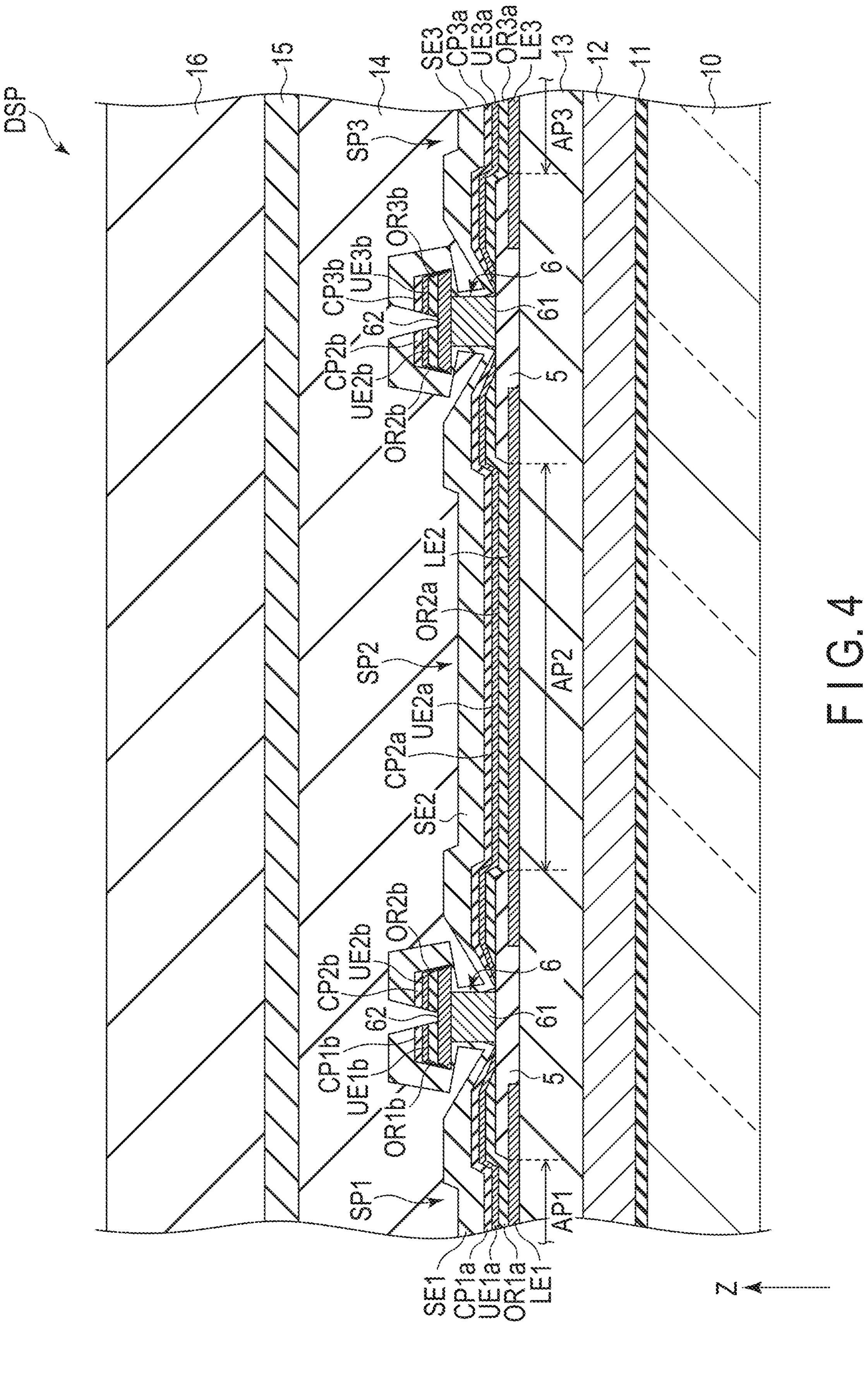
FIG. 4 is a schematic cross-sectional view showing the display device along A-A line in FIG. 2.

FIG. 4 is a schematic cross-sectional view showing the display device DSP along A-A line in FIG. 2. In the display device DSP, an insulating layer 11 referred to as an undercoat layer is provided on the base 10 (i.e., on the surface of the side where the light emitting element and the like are provided) having optical transparency such as the above-described glass.

The insulating layer 11 has, for example, a three-layer stacked structure with a silicon oxide film (SiO), a silicon nitride film (SiN), and a silicon oxide film (SiO). Incidentally, the structure of the insulating layer 11 is not limited to the three-layer stacked structure. The insulating layer 11 may have a laminated structure of more than three layers or a double-layer laminated structure.

A circuit layer 12 is provided on the insulating layer 11. The circuit layer 12 includes pixel circuits (various circuits and wires) that drive the light emitting element included in each of the subpixels SP1, SP2, and SP3 as described above. The circuit layer 12 is covered with an insulating layer 13.

The insulating layer 13 functions as a planarization film which planarizes uneven parts generated by the circuit layer 12. A contact hole for connecting a lower electrode LE to the pixel circuits is provided in the insulating layer 13 although not shown in FIG. 4.

The lower electrodes LE (LE1, LE2, and LE3) are provided on the insulating layer 13. The rib 5 is provided on the insulating layer 13 and the lower electrodes LE. Ends (parts) of the lower electrodes LE are covered with the rib 5.

The partition 6 includes a lower portion 61 provided on the rib 5 and an upper portion 62 that covers an upper surface of the lower portion 61. The upper portion 62 has a width greater in the direction X and the direction Y than the lower portion 61. As a result, the partition 6 has a shape in which both ends of the upper portion 62 protrude beyond side surfaces of the lower portion 61. Such a shape of the partition 6 may be referred to as an overhang shape.

The organic layers OR (OR1, OR2, and OR3) and the upper electrodes UE (UE1, UE2, and UE3) constitute the light emitting elements included in the subpixels SP together with the above-described lower electrodes LE (LE1, LE2, and LE3).

As shown in FIG. 4, the organic layer OR1 includes a first organic layer OR1*a* and a second organic layer OR1*b* that are separated from each other. The upper electrode UE1 includes a first upper electrode UE1*a* and a second upper electrode UE1*b* that are separated from each other. The first organic layer OR1*a* is in contact with the lower electrode LE1 through the aperture API (i.e., the aperture included in the rib 5 in the subpixel SP1) and covers a part of the rib 5. The second organic layer OR1*b* is located on the upper portion 62. The first upper electrode UE1*a* is opposed to the lower electrode LE1 and covers the first organic layer OR1*a*. Furthermore, the first upper electrode UE1*a* is in contact with side surfaces of the lower portion 61. The second upper electrode UE1*b* is located on the partition 6 and covers the second organic layer OR1*b*.

In addition, as shown in FIG. 4, the organic layer OR2 includes a first organic layer OR2*a* and a second organic layer OR2*b* that are separated from each other. The upper electrode UE2 includes a first upper electrode UE2*a* and a second upper electrode UE2*b* that are separated from each other. The first organic layer OR2*a* is in contact with the lower electrode LE2 through the aperture AP2 (i.e., the aperture included in the rib 5 in the subpixel SP2) and covers a part of the rib 5. The second organic layer OR2*b* is located on the upper portion 62. The first upper electrode UE2*a* is opposed to the lower electrode LE2 and covers the first organic layer OR2*a*. Furthermore, the first upper electrode UE2*a* is in contact with side surfaces of the lower portion 61. The second upper electrode UE2*b* is located above the partition 6 and covers the second organic layer OR2*b*.

In addition, as shown in FIG. 4, the organic layer OR3 includes a first organic layer OR3*a* and a second organic layer OR3*b* that are separated from each other. The upper electrode UE3 includes a first upper electrode UE3*a* and a second upper electrode UE3*b* that are separated from each other. The first organic layer OR3*a* is in contact with the lower electrode LE3 through the aperture AP3 (i.e., the aperture included in the rib 5 in the subpixel SP3) and covers a part of the rib 5. The second organic layer OR3*b* is located on the upper portion 62. The first upper electrode UE3*a* is opposed to the lower electrode LE3 and covers the first organic layer OR3*a*. Furthermore, the first upper electrode UE3*a* is in contact with the side surfaces of the lower portion 61. The second upper electrode UE3*b* is located above the partition 6 and covers the second organic layer OR3*b*.

In the example shown in FIG. 4, the subpixels SP1, SP2 and SP3 include cap layers CP1, CP2 and CP3 (optical path adjustment layers) for adjusting the optical properties of the light emitted from light emitting layers of the respective organic layers OR1, OR2 and OR3.

The cap layer CP1 includes a first cap layer CP1*a* and a second cap layer CP1*b* that are separated from each other. The first cap layer CP1*a* is located in the aperture AP1 and is provided on the first upper electrode UE1*a*. The second cap layer CP1*b* is located above the partition 6 and is provided on the second upper electrode UE1*b*.

The cap layer CP2 includes a first cap layer CP2*a* and a second cap layer CP2*b* that are separated from each other. The first cap layer CP2*a* is located in the aperture AP2 and is provided on the first upper electrode UE2*a*. The second cap layer CP2*b* is located above the partition 6 and is provided on the second upper electrode UE2*b*.

The cap layer CP3 includes a first cap layer CP3*a* and a second cap layer CP3*b* that are separated from each other. The first cap layer CP3*a* is located in the aperture AP3 and is provided on the first upper electrode UE3*a*. The second cap layer CP3*b* is located above the partition 6 and is provided on the second upper electrode UE3*b*.

Sealing layers SE1, SE2 and SE3 are provided in the subpixels SP1, SP2 and SP3, respectively. The sealing layer SE1 continuously covers the members of the subpixel SP1 including the first cap layer CP1*a*, the partition 6, and the second cap layer CP1*b*. The sealing layer SE2 continuously covers the members of the subpixel SP2 including the first cap layer CP2*a*, the partition 6, and the second cap layer CP2*b*. The sealing layer SE3 continuously covers the members of the subpixel SP3 including the first cap layer CP3*a*, the partition 6, and the second cap layer CP3*b*.

In the example shown in FIG. 4, the second organic layer OR1*b*, the second upper electrode UE1*b*, the second cap layer CP1*b*, and the sealing layer SE1 on the partition 6 between the subpixels SP1 and SP2 are separated from the second organic layer OR2*b*, the second upper electrode UE2*b*, the second cap layer CP2*b*, and the sealing layer SE2 on the partition 6. In addition, the second organic layer OR2*b*, the second upper electrode UE2*b*, the second cap layer CP2*b*, and the sealing layer SE2 on the partition 6 between the subpixels SP2 and SP3 are separated from the second organic layer OR3*b*, the second upper electrode UE3*b*, the second cap layer CP3*b*, and the sealing layer SE3 on the partition 6.

The sealing layers SE1, SE2 and SE3 are covered with a resin layer 14 (planarization film). The resin layer 14 is covered with a sealing layer 15. Furthermore, the sealing layer 15 is covered with a resin layer 16.

The insulating layer 13 and the resin layers 14 and 16 are formed of organic materials. The rib 5, and the sealing layers 15 and SE (SE1, SE2 and SE3) are formed of, for example, an inorganic material such as silicon nitride (SiNx).

The lower portion 61 included in the partition 6 is electrically conductive. The upper portion 62 included in the partition 6 may also be electrically conductive. The lower electrode LE may be formed of a transparent conductive oxide such as indium tin oxide (ITO) or may have a laminated structure of a metal material such as silver (Ag) and a conductive oxide. The upper electrode UE may be formed of a conductive oxide such as ITO.

When the potential of the lower electrode LE is relatively higher than the potential of the upper electrode UE, the lower electrode corresponds to an anode, and the upper electrode UE corresponds to a cathode. In addition, when the potential of the upper electrode UE is relatively higher than the potential of the lower electrode LE, the upper electrode UE corresponds to an anode, and the lower electrode LE corresponds to a cathode.

The organic layer OR includes a pair of functional layers, and a light emitting layer provided between these functional layers. In one example, the organic layer OR has a structure in which a hole-injection layer, a hole-transport layer, an electron blocking layer, a light emitting layer, a hole blocking layer, an electron-transport layer, and an electron-injection layer are stacked in this order.

The cap layer CP (CP1, CP2, and CP3) is formed of, for example, a multilayer body of a plurality of transparent thin films. As the plurality of thin films, the multilayer body may include a thin film formed of an inorganic material and a thin film formed of an organic material. In addition, these thin films have refractive indices different from each other. The materials of the thin films constituting the multilayer body are different from the materials of the upper electrode UE and are also different from the materials of the sealing layer SE. The cap layer CP may be omitted.

A common voltage is supplied to the partition 6. This common voltage is supplied to each of the upper electrodes UE (first upper electrodes UE1*a*, UE2*a*, and UE3*a*) that are in contact with the side surfaces of the lower portion 61. A pixel voltage is supplied to the lower electrode LE (LE1, LE2, and LE3) through the pixel circuit included in each subpixel SP (SP1, SP2, and SP3).

When a potential difference is formed between the lower electrode LE1 and the upper electrode UE1, the light emitting layer of the first organic layer OR1*a* emits light of the red wavelength range. When a potential difference is formed between the lower electrode LE2 and the upper electrode UE2, the light emitting layer of the first organic layer OR2*a* emits light of the green wavelength range. When a potential difference is formed between the lower electrode LE3 and the upper electrode UE3, the light emitting layer of the first organic layer OR3*a* emits light of the blue wavelength range.

As another example, the light emitting layers of the organic layers OR1, OR2, and OR3 may emit light of the same color (for example, white). In this case, the display device DSP may include a color filter that converts the light emitted from the light emitting layers into light of the color corresponding to the subpixels SP1, SP2, and SP3. In addition, the display device DSP may include a layer including quantum dots that are excited by the light emitted from the light emitting layers to generate the light of the colors corresponding to the subpixels SP1, SP2, and SP3.

Figure 5:
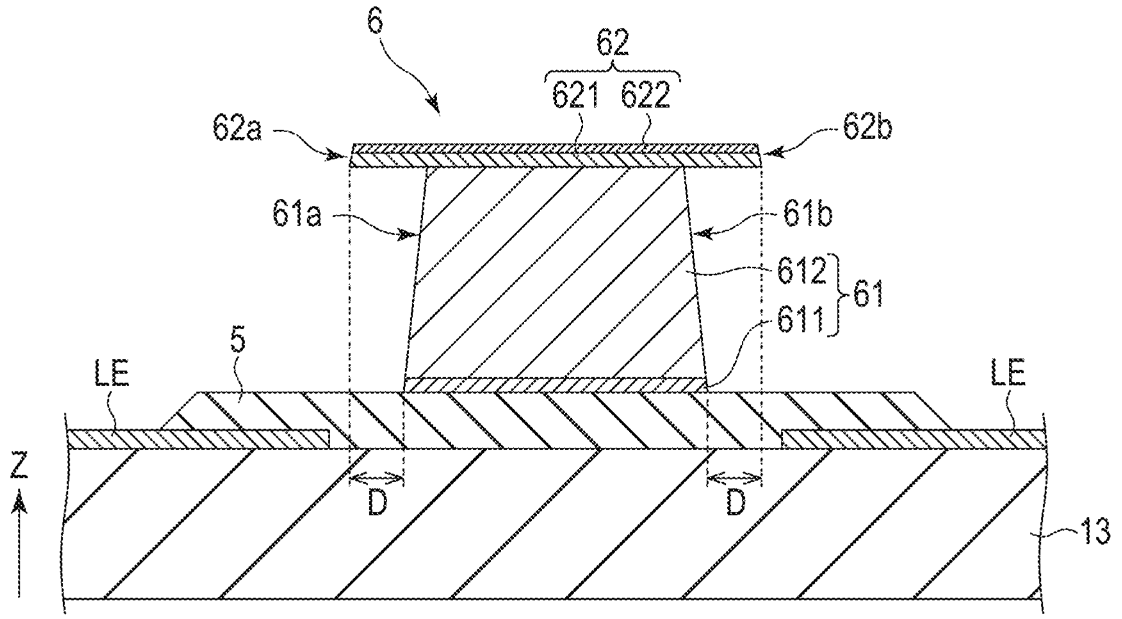
FIG. 5 is a schematic enlarged cross-sectional view showing a partition.

FIG. 5 is a schematic enlarged cross-sectional view showing the partition 6. In FIG. 5, the elements other than the rib 5, the partition 6, the insulating layer 12 and a pair of lower electrodes LE are omitted. The pair of lower electrodes LE correspond to any of the above-described lower electrodes LE1, LE2, and LE3.

In the example shown in FIG. 5, the lower portion 61 of the partition 6 includes a barrier layer (bottom portion) 611 provided on the rib 5, and a metal layer (stem portion) 612 provided on the barrier layer 611. The barrier layer 611 is formed of a material different from the metal layer 612, for example, a metal material such as molybdenum (Mo), titanium (Ti), or titanium nitride (TiN). The metal layer 612 is formed to be thicker than the barrier layer 611. The metal layer 612 may have a single-layer structure or a laminated structure of simple metal materials. In one example, the metal layer 612 is formed of, for example, aluminum (Al).

The upper portion (top portion) 62 is thinner than the lower portion 61. In the example shown in FIG. 5, the upper portion 62 includes a first layer 621 provided on the metal layer 612, and a second layer 622 provided on the first layer 621. In one example, the first layer 621 is formed of, for example, titanium (Ti) and the second layer 622 is formed of, for example, ITO.

In the example shown in FIG. 5, the width of the lower portion 61 becomes smaller toward the upper portion 62. In other words, the side surfaces 61*a* and 61*b* of the lower portion 61 are inclined to the third direction Z. Incidentally, the upper portion 62 includes an end portion 62*a* protruding from the side surface 61*a* and an end portion 62*b* protruding from the side surface 61*b*.

The amount D of protrusion of each of the end portions 62*a* and 62*b* from the side surfaces 61*a* and 61*b* (hereinafter, referred to as the protrusion amount D of the partition 6) is, for example, less than or equal to 2.0 μm. The protrusion amount D of the partition 6 in the embodiment corresponds to a distance in the width direction (first direction X or second direction Y) orthogonal to the third direction Z of the partition 6, between a lower end (barrier layer 611) of the side surfaces 61*a* and 61*b*, and the end portions 62*a* and 62*b*.

Incidentally, in the example shown in FIG. 5, the side surface of the barrier layer 611 and the side surface of the metal layer 612 are aligned to form a plane having no steps, but, for example, the side surface of the barrier layer 611 may slightly retreat with respect to the side surface of the metal layer 612 or protrude toward the side surface of the metal layer 612. In addition, in FIG. 5, the side surfaces of the barrier layer 611 and the metal layer 612 (i.e., the side surfaces 61*a* and 61*b* of the lower portion 61) are inclined to the third direction Z but may be parallel to the third direction Z.

The structure of the partition 6 and the materials of the parts of the partition 6 can be selected as appropriate by considering, for example, a method of forming the partition 6, and the like.

In the embodiment, the partition 6 is formed to divide the subpixels SP in plan view. The above-described organic layer OR is formed by, for example, anisotropic or directional vacuum evaporation but, when the organic material for forming the organic layer OR is evaporated over the entire base 10 in a state in which the partition 6 is provided, the organic layer OR is hardly formed on the side surfaces of the partition 6 since the partition 6 has the shape shown in FIG. 4 and FIG. 5. According to this, the organic layer OR (light emitting element) which is divided for each subpixel SP by the partition 6 can be formed.

Figure 6:
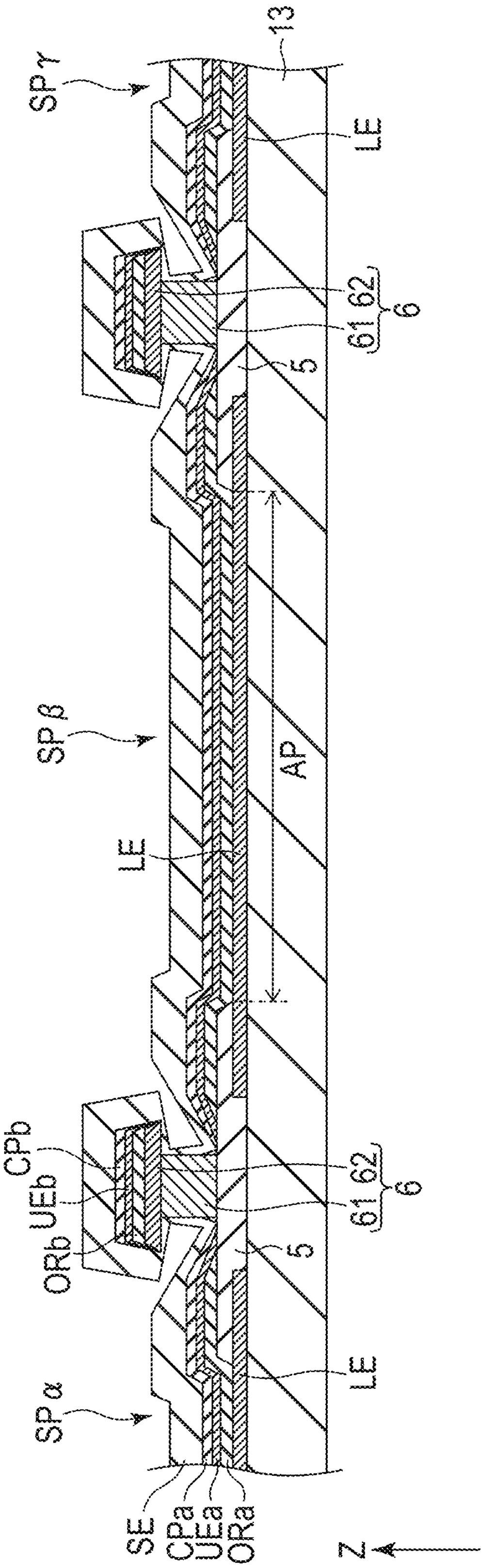
FIG. 6 is a schematic cross-sectional view illustrating the light emitting element formed using the partition.
Figure 7:
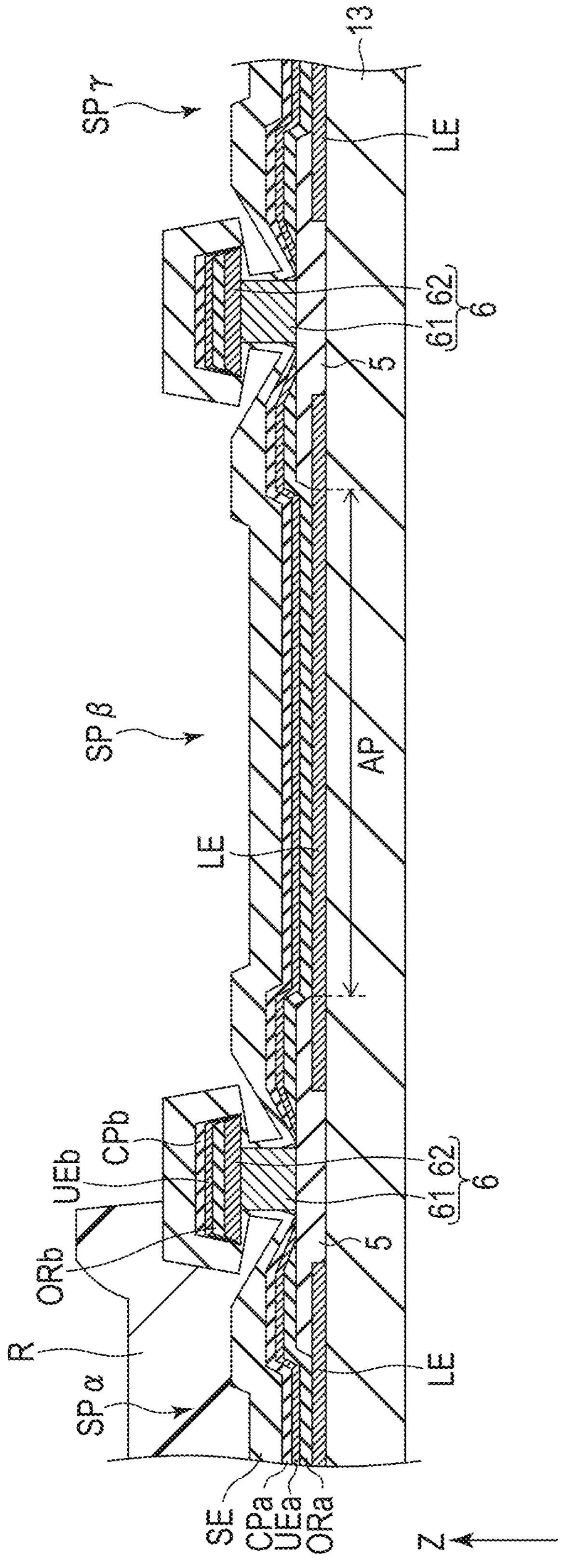
FIG. 7 is a schematic cross-sectional view illustrating the light emitting element formed using the partition.
Figure 8:
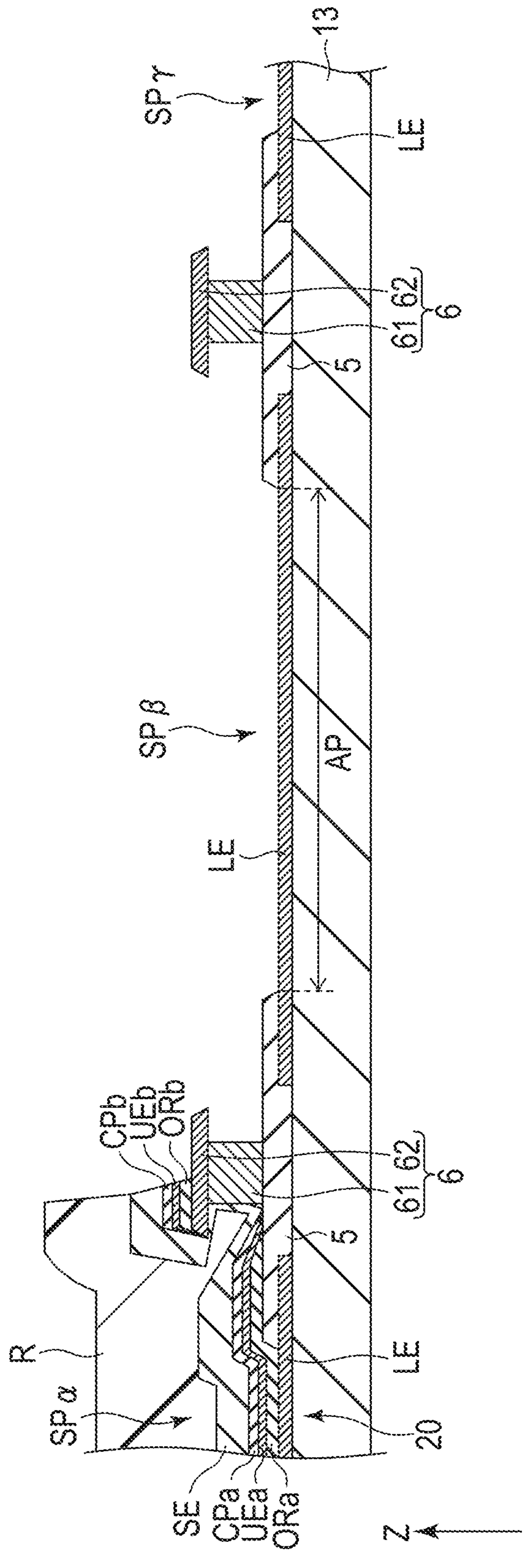
FIG. 8 is a schematic cross-sectional view illustrating the light emitting element formed using the partition.

FIG. 6 to FIG. 8 are schematic cross-sectional views illustrating the light emitting element formed using the partition 6. Incidentally, the base 10, and the insulating layers 11 and 12 are omitted in FIG. 6 to FIG. 8. In addition, each of subpixels SPα, SPβ and SPγ shown in FIG. 6 to FIG. 8 corresponds to one of the subpixels SP1, SP2 and SP3.

First, in a state in which the partition 6 is provided as described above, the organic layer OR, the upper electrode UE, the cap layer CP, and the sealing layer SE are formed in order on the entire base 10 by vapor deposition as shown in FIG. 6. The organic layer OR includes a light emitting layer which emits light of the color corresponding to the subpixel SPα. The partition 6 having an overhang shape divides the organic layer OR into a first organic layer ORa which is in contact with the lower electrode LE through the aperture AP and a second organic layer ORb on the partition 6, and divides the upper electrode UE into a first upper electrode UEa which covers the first organic layer ORa and a second upper electrode UEb which covers the second organic layer ORb, and divides the cap layer CP into a first cap layer CPa which covers the first upper electrode UEa and a second cap layer CPb which covers the second upper electrode UEb. The first upper electrode UEa is in contact with the lower portion 61 of the partition 6. The sealing layer SE continuously covers the first cap layer CPa, the partition 6, and the second cap layer CPb.

Next, a resist R is formed on the sealing layer SE as shown in FIG. 7. The resist R covers the subpixel SPα. In other words, the resist R is provided directly above the first organic layer ORa, the first upper electrode UEa, and the first cap layer CPa, which are located in the subpixel SPα. The resist R is also located directly above portions close to the subpixel SPα, of the second organic layer ORb, the second upper electrode UEb, and the second cap layer CPb on the partition 6 between the subpixel SPα and the subpixel SPβ. In other words, at least a part of the partition 6 is exposed from the resist R.

Furthermore, portions exposed from the resist R, of the organic layer OR, the upper electrode UE, the cap layer CP and the sealing layer SE, are removed as shown in FIG. 8, by etching using the resist R as a mask. The light emitting element including the lower electrode LE, the first organic layer ORa, the first upper electrode UEa, and the first cap layer CPa is thereby formed in the subpixel SPα. In contrast, the lower electrode LE is exposed in the subpixels SPβ and SPγ. The above-described etching includes, for example, dry etching of the sealing layer SE, wet etching and dry etching of the cap layer CP, wet etching of the upper electrode UE, and dry etching of the organic layer OR.

When the light emitting element of the subpixel SPα is formed as described above, the resist R is removed, and the light emitting elements of the subpixels SPβ and SPγ are formed in order similarly to the subpixel SPα.

The light emitting elements of the subpixels SP1, SP2, and SP3 are formed, and the resin layer 14, the sealing layer 15, and the resin layer 16 are formed, as exemplified for the above subpixels SPα, SPβ and SPγ, and the structure of the display device DSP shown in FIG. 4 is thereby implemented.

The pixel circuit which drives the light emitting element is included in each of the plurality of subpixels SP as described above. An example of a circuit configuration of the pixel circuit will be described with reference to FIG. 9. A pixel circuit 100 shown in FIG. 9 is a 7Tr1C circuit including seven transistors Tr1 to Tr7 and one storage capacitor Cst.

Figure 9:
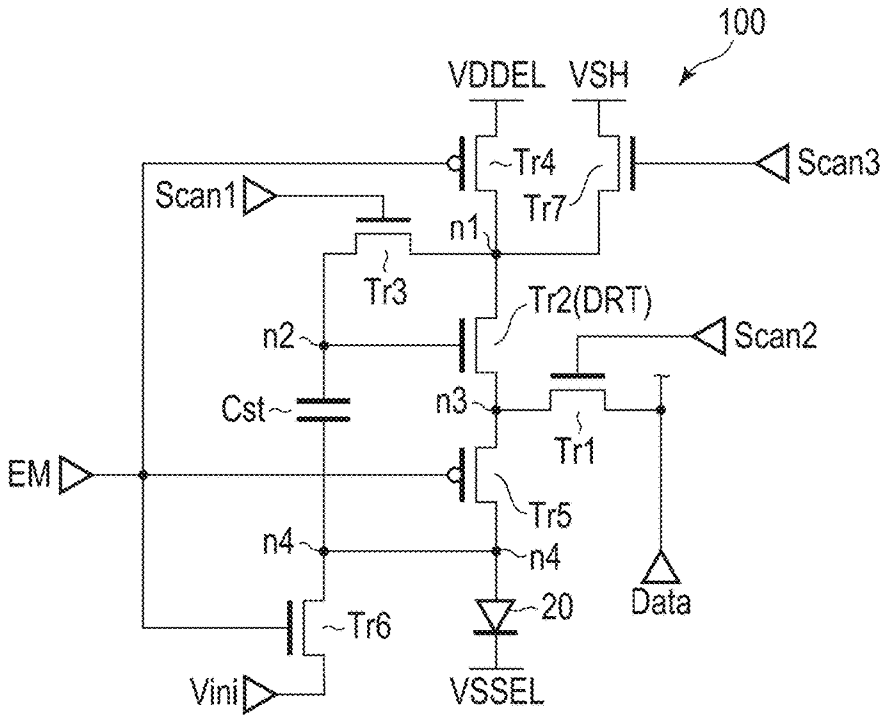
FIG. 9 is a view illustrating an example of a circuit configuration of a pixel circuit.

In the following descriptions, one of a source terminal and a drain terminal of each of the transistors Tr1 to Tr7 shown in FIG. 9 is referred to as a first terminal, and the other is referred to as a second terminal. In addition, one of terminals of (the capacitance element realizing) the storage capacitor Cst shown in FIG. 9 is referred to as a first terminal, and the other is referred to as a second terminal.

The first terminal of the transistor Tr1 is connected to the first terminal of the transistor Tr2 and the second terminal of the transistor Tr5 via a node n3. The second terminal of the transistor Tr1 is connected to a data signal line that supplies a data signal Data. The data signal Data corresponds to a signal (pixel signal) to be written to the pixel. Incidentally, the transistor Tr1 is, for example, an n-channel transistor.

The transistor Tr2 corresponds to a drive transistor (DRT) that supplies a current to the light emitting element 20 included in the subpixel SP (i.e., the light emitting element 20 driven by the pixel circuit 100). The first terminal of the transistor Tr2 is connected to the first terminal of the transistor Tr1 and the second terminal of the transistor Tr5 via a node n3. The second terminal of the transistor Tr2 is connected to the second terminal of the transistor Tr3, the first terminal of the transistor Tr4, and the first terminal of transistor Tr7 via a node n1. Incidentally, the transistor Tr2 is, for example, an n-channel transistor.

The first terminal of the transistor Tr3 is connected to the gate terminal of the transistor Tr2 and the second terminal of the storage capacitor Cst via a node n2. The second terminal of the transistor Tr3 is connected to the second terminal of the transistor Tr2, the first terminal of the transistor Tr4, and the first terminal of the transistor Tr7 via a node n1. Incidentally, the transistor Tr3 is, for example, an n-channel transistor.

The first terminal of the transistor Tr4 is connected to the second terminal of the transistor Tr2, the second terminal of the transistor Tr3, and the first terminal of the transistor Tr7 via the node n1. The second terminal of the transistor Tr4 is connected to a power line that supplies a power supply voltage VDDEL. Incidentally, the transistor Tr4 is, for example, a p-channel transistor.

The first terminal of the transistor Tr5 is connected to the first terminal of the transistor Tr6, the first terminal of the storage capacitor Cst, and the anode terminal of the light emitting element 20 via a node n4. The second terminal of the transistor Tr5 is connected to the first terminal of the transistor Tr1 and the first terminal of the transistor Tr2 via the node n3. Incidentally, the transistor Tr5 is, for example, a p-channel transistor.

The first terminal of the transistor Tr6 is connected to the first terminal of the transistor Tr5, the first terminal of the storage capacitor Cst, and the anode terminal of the light emitting element 20 via the node n4. The second terminal of the transistor Tr6 is connected to a power supply line that supplies an initialization voltage Vini. Incidentally, the transistor Tr6 is, for example, an n-channel transistor.

The first terminal of the transistor Tr7 is connected to the second terminal of the transistor Tr2, the second terminal of the transistor Tr3, and the first terminal of the transistor Tr4 via the node n1. The second terminal of the transistor Tr7 is connected to a power line that supplies a power supply voltage VSH. Incidentally, the transistor Tr7 is, for example, an n-channel transistor.

In addition, as shown in FIG. 9, the gate terminal of the transistor Tr1 is connected to a gate signal line that supplies a gate signal Scan2. The gate terminal of the transistor Tr3 is connected to a gate signal line that supplies a gate signal Scan1. The gate terminals of the transistors Tr4 to Tr6 are connected to a control signal line that supplies a control signal EM. The gate terminal of the transistor Tr7 is connected to the gate signal line that supplies the gate signal Scan3.

The first terminal of the storage capacitor Cst is connected to the first terminal of the transistor Tr5, the first terminal of the transistor Tr6, and the anode terminal of the light emitting element 20 via the node n4. The second terminal of the storage capacitor Cst is connected to the gate terminal of the transistor Tr2 and the first terminal of the transistor Tr3 via the node n2.

The anode terminal of the light emitting element 20 is connected to the first terminal of the transistor Tr5, the first terminal of the transistor Tr6, and the first terminal of the storage capacitor Cst via the node n4. The cathode terminal of the light emitting element 20 is connected to a power supply line that supplies a power supply voltage VSSEL. The above-described power supply voltage VDDEL corresponds to the anode voltage supplied to the light emitting element 20, and the power supply voltage VSSEL corresponds to the cathode voltage supplied to the light emitting element 20.

Figure 10:
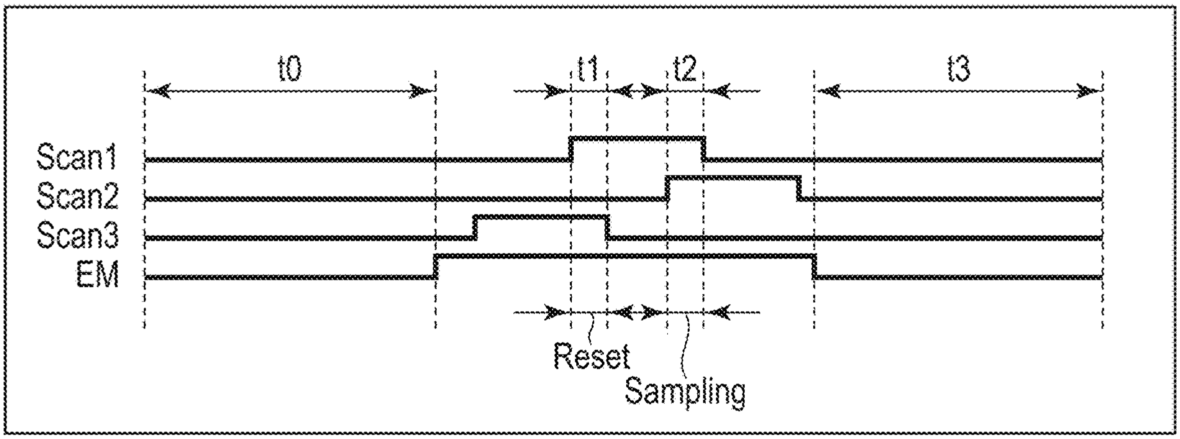
FIG. 10 is a chart illustrating an example of an operation of the pixel circuit according to a comparative example of the embodiment.

An example of the operation of the pixel circuit 100 (7Tr1C pixel circuit) in a comparative example of the embodiment will be described below with reference to FIG. 10. FIG. 10 is a timing chart showing an example of output of the gate signals Scan1 to Scan3 and the control signal EM to (the subpixel SP including) the pixel circuit 100.

Incidentally, a plurality of transistors constituting the pixel circuit 100 include n-channel transistors and p-channel transistors. The n-channel transistors are the switching elements that become an off state (non-conductive state) when a low (level) signal is supplied to their gate terminals and that become an on state (conductive state) when a high (level) signal is supplied to their gate terminals. In contrast, the p-channel transistors are the switching elements that becomes the off state (non-conductive state) when a high (level) signal is supplied to their gate terminals and that become the on state (conductive state) when a low (level) signal is supplied to their gate terminals.

During a period to shown in FIG. 10, since the control signal EM is low, the transistors Tr4 and Tr5 of the seven transistors included in the pixel circuit 100 are in the on state and the transistor Tr6 is in the off state.

In addition, during the period to, since the gate signals Scan1 to Scan3 are low, the transistors Tr1, Tr3 and Tr7 are in the off state.

According to this, the current controlled by the gate voltage of the transistor Tr2 (i.e., the voltage supplied to the gate terminal of the transistor Tr2 based on the data signal Data of the previous frame) flows to the light emitting element 20 (OLED), and the state in which the light emitting element 20 emits light is maintained.

Incidentally, the control signal EM is switched from low to high at the timing of end of the period to.

Next, a period t1 shown in FIG. 10 corresponds to a reset period in which the voltage written to the storage capacitor Cst based on the power supply voltage VSH and the initialization voltage Vini is reset. In the period t1, since the control signal EM is high, the transistors Tr4 and Tr5 are in the off state and the transistor Tr6 is in the on state. In this case, since the initialization voltage Vini is supplied to the node n4 via the transistor Tr6 but the initialization voltage Vini is set to a value at which no current flows to the light emitting element 20, no current flows to the light emitting element 20 during the period t1.

In addition, the gate signal Scan1 is switched from low to high at the timing of start of the period t1. Therefore, the transistor Tr3 becomes in the on state during the period t1. Furthermore, the gate signal Scan3 is switched from low to high after the period to ends and before the period t1 starts. Therefore, the transistor Tr7 is in the on state during the period t1. According to this, the power supply voltage VSH is supplied to the gate terminal of the transistor Tr2 via the transistors Tr7 and Tr3. In this case, a voltage of VS−Vini is applied to (between the first and second terminals of) the storage capacitor Cst, and the information of the previous frame is reset.

Incidentally, the gate signal Scan3 is switched from high to low at the timing of end of the period t1.

Next, a period t2 shown in FIG. 10 corresponds to a sampling period in which the voltage corresponding to the data signal Data is written to the storage capacitor Cst. The gate signal Scan2 is switched from low to high at the timing of start of the period t2. Therefore, the transistor Tr1 becomes in the on state during the period t2. In addition, during the period t2, since the gate signal Scan3 is low, the transistor Tr7 is in the off state.

In this case, (a voltage Vdata corresponding to) the data signal Data and a threshold voltage Vth of the transistor Tr2 (i.e., a voltage corresponding to Vdata+Vth) are supplied to the gate terminal (node n2) of the transistor Tr2 via the transistors Tr1 to Tr3. Accordingly, the voltage of Vdata+Vth−Vini is applied to the storage capacitor Cst, and the information on Vdata and Vth is written to the storage capacitor Cst (in other words, the voltage that controls the current supplied to the light emitting element 20 by the transistor Tr2 is written to the storage capacitor Cst).

Incidentally, the gate signal Scan1 is switched from high to low at the timing of end of the period t2.

Next, a period t3 shown in FIG. 10 corresponds to a light emission period in which a current is supplied to the light emitting element 20 (i.e. the light emitting element 20 is made to emit light). In addition, during the period t3, since the gate signal Scan1 is low, the transistor Tr3 is in the off state. In addition, since the gate signal Scan2 is switched from high to low before the period t3 starts, the transistor Tr1 is in the off state. Furthermore, the control signal EM is switched from high to low at the timing of start of the period t3. Therefore, the transistor Tr4 and Tr5 become the on state and the transistor Tr6 becomes in the off state.

If the first terminal of transistor Tr2 is assumed to be the source terminal, a voltage Vgs between the gate terminal and source terminal (nodes n2 to n3) of the transistor Tr2 becomes the voltage of the storage capacitor Cst (Vdata+Vth−Vini). In this case, the transistor Tr2 becomes the on state and a current flows from a power line connected to the second terminal of the transistor Tr4 (i.e., a power line supplying the power voltage VDDEL) to the node n4. In accordance with this, a potential at the node n4 starts rising, and when the potential exceeds a threshold value of the light emitting element 20 (OLED), a current starts flowing to the light emitting element 20, and the light emission at the light emitting element 20 is started. Finally, when the current Ioled flowing to the light emitting element 20 reaches an output current supplied by the transistor Tr2 (i.e., an output current in the saturation range of the transistor Tr2), the rise in the potential of the node n4 stops and the light emitting element 20 becomes in a steady light emission state.

Incidentally, when the voltage between the gate terminal and the source terminal of the transistor Tr2, Vgs=Vdata+Vth−Vini is substituted into TFT saturation equation, $Idrt=1/2Cox*\mu*W/L*(Vgs-Vth)^2$, $Idrt(=I\ oled)=1/2Cox*\mu*W/L*(Vdata-Vini)^2$ is obtained. Cox refers to the gate capacitance per unit area, μ refers to the carrier mobility, W refers to the channel width of the transistor Tr2, and L refers to the channel length of the transistor Tr2.

According to this, it can be understood that Idrts becomes a value independent of the threshold voltage Vth of the transistor Tr2 (in other words, a current independent of the threshold voltage Vth of the transistor Tr2 flows through the light emitting element 20), and can eliminate the influence of the variation in threshold voltage Vth on Idrts.

In other words, the above-described pixel circuit 100 (7Tr1C pixel circuit) is considered to include a function of correcting the variation in the threshold voltage Vth of the transistor Tr2 (Vth correction function).

Incidentally, the display device DSP operates to sequentially display frames (images) in the display area DA. In the comparative example of the embodiment, the period for displaying one frame in the display area DA (hereinafter referred to as "one frame period") includes the reset period (i.e., period t1 shown in FIG. 10), the sampling period (period t2 shown in FIG. 10), and the light emission period (period t3 shown in FIG. 10).

The case where the frame displayed in each frame period is a black image (hereinafter referred to as "black display") will be described with reference to FIG. 11. As described above, a current is supplied from the transistor Tr2 to the light emitting element 20, based on the voltage written to the storage capacitor Cst, in the light emission period included in the one frame period. During the light emission period at the black display, the voltage Vgs applied to the transistor Tr2 is reduced (in other words, the transistor Tr2 is set in the off state such that no current is supplied to the light emitting element 20) to realize luminance 201 shown in FIG. 11. In this case, at the timing when the light emission period at the black display ends, the transistor Tr2 is in a state where carriers are not trapped in defects in the channel area of the semiconductor layer constituting the transistor Tr2 (hereinafter referred to as "untrapped state").

Next, a case where the frame displayed in each frame period is a white image (hereinafter referred to as "white display") will be described with reference to FIG. 12. During the light emission period at the white display, the voltage Vgs applied to the transistor Tr2 is increased (in other words, the transistor Tr2 is set in the on state such that a current is supplied to the light emitting element 20) to realize luminance 202 shown in FIG. 12. In this case, at the timing when the light emission period at the white display ends, the transistor Tr2 is in a state where carriers are trapped in defects in the channel area of the semiconductor layer constituting the transistor Tr2 (hereinafter referred to as "trapped state"). Thus, in the transistor Tr2 in the trapped state, the flowing current becomes smaller than that in the untrapped state.

Figure 11:
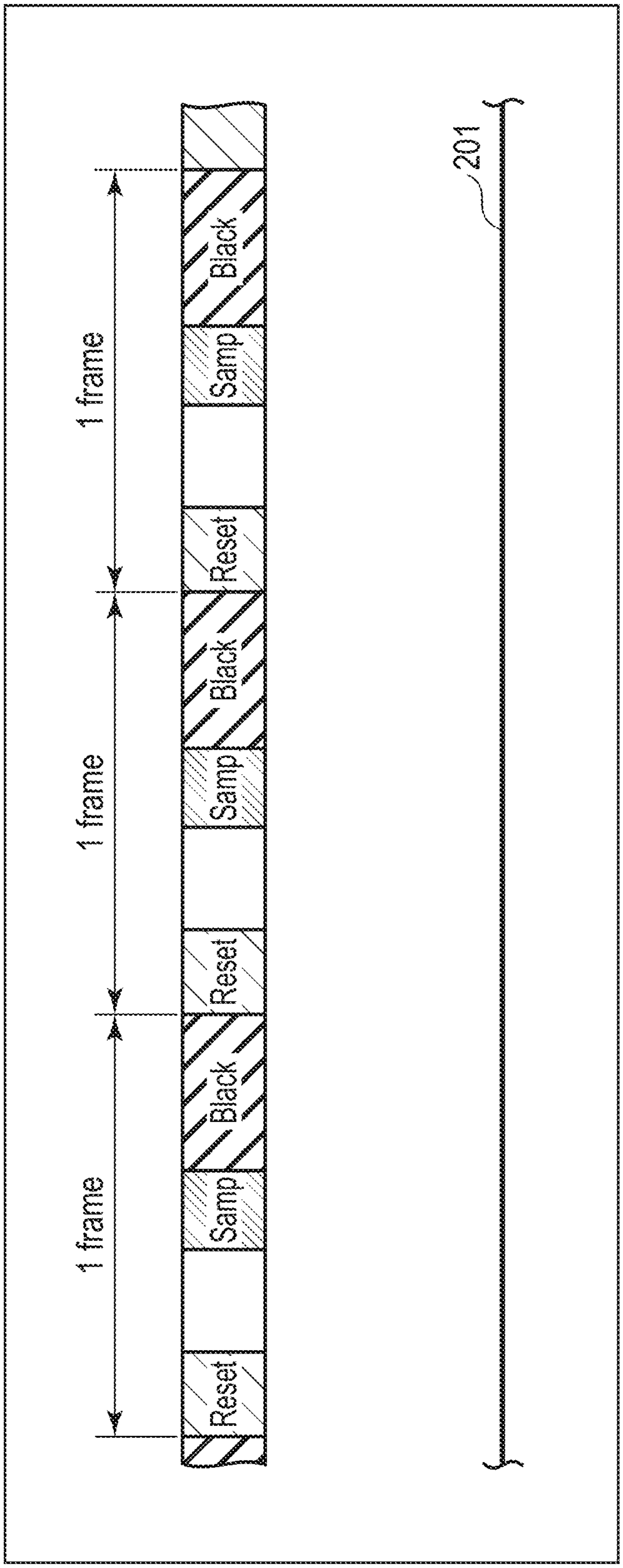
FIG. 11 is a view illustrating a case where a frame displayed in each frame period is a black image.
Figure 12:
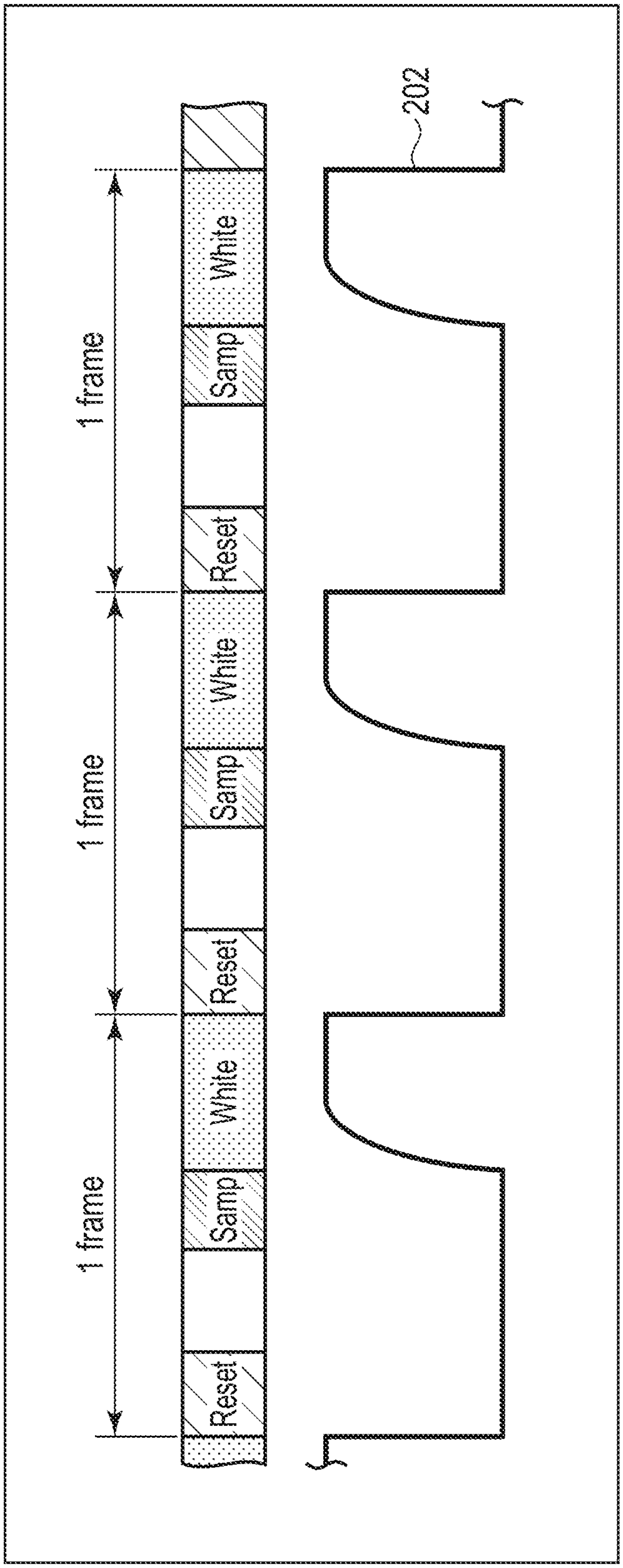
FIG. 12 is a view illustrating a case where a frame displayed in each frame period is a white image.

Incidentally, in FIG. 11 and FIG. 12 described above, the arrangement of the reset period, the sampling period, and the light emission period included in one frame period is shown schematically, and "Reset" indicates the reset period and "Sampling" indicates the sampling period. In addition, "Black" shown in FIG. 11 indicates the light emission period at the black display, and "White" shown in FIG. 12 indicates the light emission period at the white display. The periods are shown in the same manner in FIG. 13 and FIG. 14 to be described below.

Figure 13:
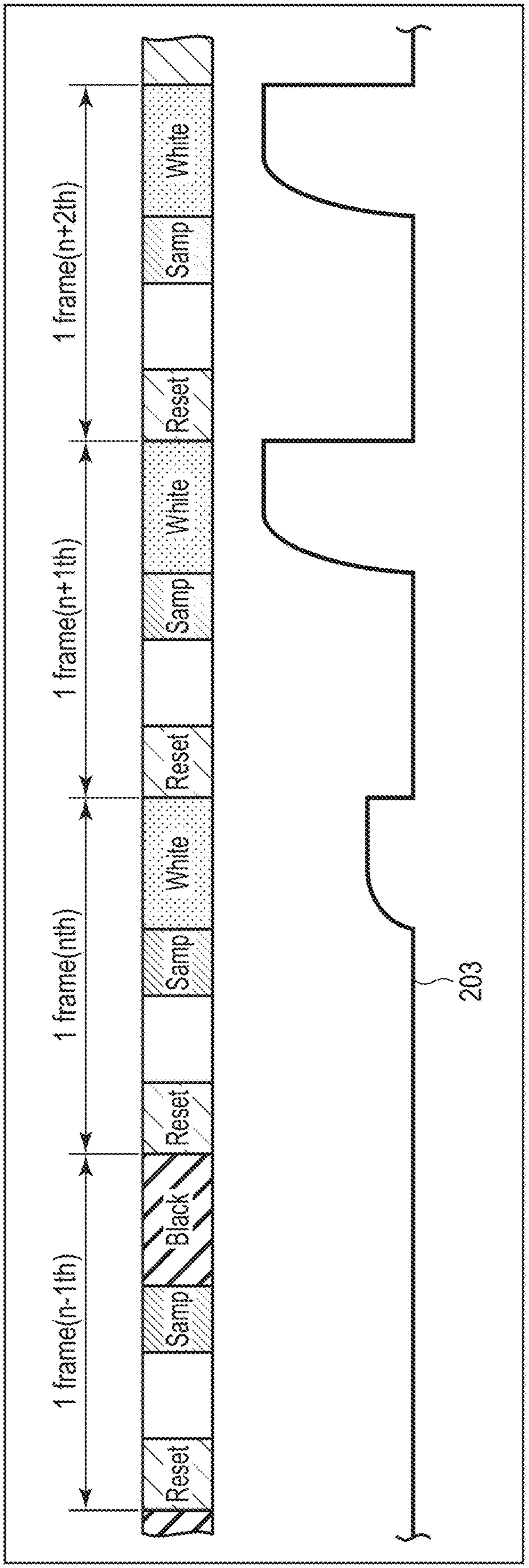
FIG. 13 is a view illustrating a case where black display is changed to white display.

Changing the black display to the white display will be described with reference to FIG. 13. In FIG. 13, it is assumed that the frame displayed in the n−1-th frame period is a black image and that the frame displayed in the n-th to n+2-th frame periods is a white image.

First, since the transistor Tr2 is in the off state during the light emission period included in the n−1-th frame period, the transistor Tr2 is in the untrapped state at the timing when the light emission period ends.

Next, during the reset period and the sampling period included in the n-th frame period, the pixel circuit 100 operates and the voltage of Vdata+Vth−Vini is thereby written (applied) to the storage capacitor Cst. Thus, during the light emission period included in the n-th frame period, the light emitting element 20 emits light in response to the current Idrt $(=1/2Cox*\mu*W/L*(Vdata-Vini)^2)$ supplied from the transistor Tr2, based on the voltage (Vdata+Vth−Vini) written to the storage capacitor Cst.

Incidentally, since the transistor Tr2 is in the on state during the light emission period included in the n−1-th frame period, the transistor Tr2 is in the trapped state at the timing when the light emission period ends.

Next, when the pixel circuit 100 operates during the reset period and the sampling period included in the n+1-th frame period, the current flowing through the transistor Tr2 during the sampling period becomes smaller than the current flowing through the transistor Tr2 during the sampling period included in the n-th frame period described above since the transistor Tr2 is in the trapped state.

In this case, during the sampling period included in the n-th frame period, a voltage equivalent to Vdata+Vth is supplied to the node n2 while, during the sampling period included in the n+1-th frame period, the potential of the node n2 does not reach Vdata+Vth (in other words, writing up to Vdata+Vth cannot be executed, and a voltage equivalent to Vdata+Vth+a is supplied to the node n2). According to this, the voltage of Vdata+Vth−Vini+x is written to the storage capacitor Cst, and the voltage written to the storage capacitor Cst in the n+1-th frame period becomes higher than the voltage written to Cst during the n-th frame period.

During the light emission period included in the n+1-th frame period, the light emitting element 20 emits light in accordance with the current $Idrt(=1/2Cox*\mu*W/L*(Vdata-Vini+\alpha)^2)$ supplied from the transistor Tr2 based on the voltage (Vdata+Vth−Vini +α) written to the storage capacitor Cst in this manner.

In this example, the n+1-th frame period has been described. Since the n+2-th frame period has the same configuration, detailed descriptions of the n+2-th frame period will be omitted.

When the black display is switched to the white display as described above, a frame (first frame of the white display) is displayed at the luminance achieved by the light emitting element 20 emitting light in accordance with the current $Idrt(=1/2Cox*\mu*W/L*(Vdata-Vin))$, during the n-th frame period, while the frames (the second and subsequent frames of the white display) in the n+1-th and subsequent frame periods are displayed at the luminance achieved by the light emitting element 20 emitting light in accordance with the current $Idrt(=1/2Cox*\mu*W/L*(Vdata-Vin+\alpha)^2)$, similarly to luminance 203 shown in FIG. 13.

In other words, in the comparative example of the above-described embodiment, since the sampling process during the sampling period included in the frame period for displaying the first frame of the white display is fast (i.e., a large amount of current flows through the transistor Tr2 flows during the sampling period), the luminance of the first frame of the white display becomes lower than the luminance of the second frame and subsequent frames of the white display, and the display quality of the display device DSP is degraded based on the luminance difference.

Figure 14:
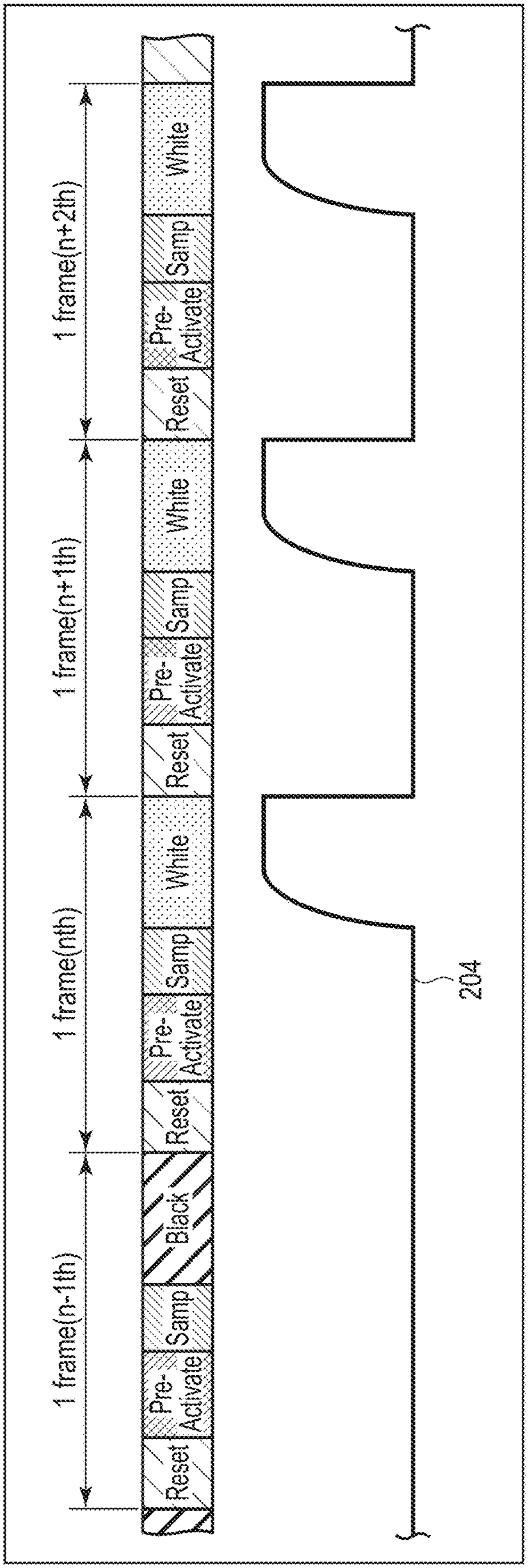
FIG. 14 is a view showing an arrangement example during pre-activate period in the embodiment.

Thus, in the embodiment, as shown in FIG. 14, a pre-activate period is arranged during the reset period and the sampling period included in each frame period. The pre-activate period is a period in which voltage Vgs is applied to the transistor Tr2 in order to set the transistor Tr2 to be in the on state.

In the embodiment, by keeping the transistor Tr2 in the on state during the above-described pre-activate period, the transistor Tr2 is in a trapped state, for example, even in the first frame of the white display, and the current flowing through the transistor Tr2 during the sampling period is substantially the same level as that in the second frame and subsequent frames of the white display. As a result, in the embodiment, the luminance difference between the first frame and the second and subsequent frames, of the white display, can be reduced as indicated by luminance 204 shown in FIG. 14, and the degradation in the display quality of the display device DSP can be suppressed.

An example of the operation of the pixel circuit 100 according to the embodiment will be described below with reference to FIG. 15. Incidentally, portions different from those shown in FIG. 10 will be mainly described.

Figure 15:
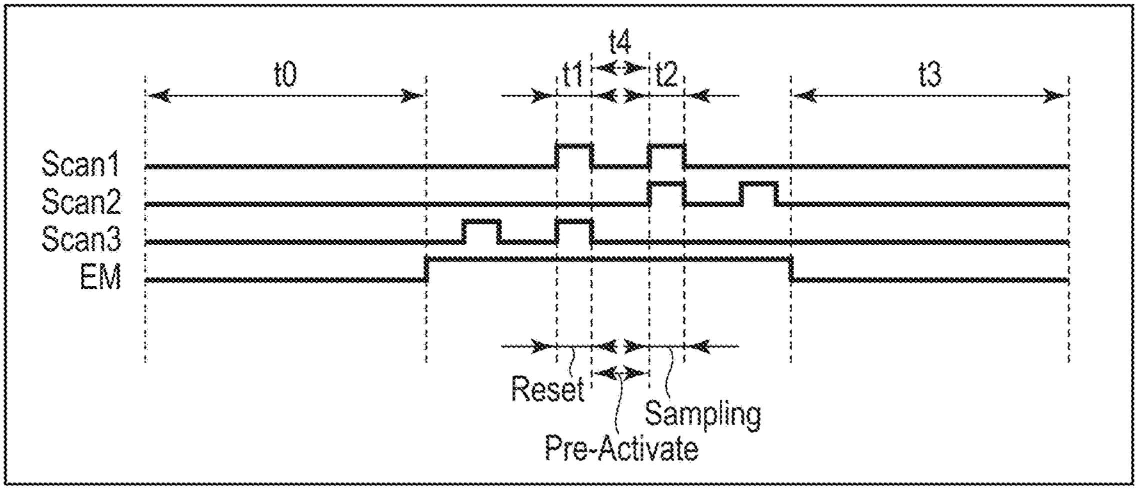
FIG. 15 is a chart illustrating an example of an operation of the pixel circuit according to the embodiment.

As shown in FIG. 15, in the embodiment, a period t4 (pre-activate period) is arranged between the period t1 (reset period) and the period t2 (sampling period).

The gate signal Scan1 is switched from high to low at the timing of start of the period t4. Therefore, the transistor Tr3 becomes in the off state during the period t4.

According to the period t4, the voltage of the source and drain terminals (nodes n1 and n3) of the transistor Tr2 can be pulled down below the gate voltage by the coupling of the gate signal line (transistor Tr3) supplying the gate signal Scan1 and the node n1.

More specifically, although no current flows through the transistor Tr3 during the period t4, the voltage of the node n1 is lowered due to an influence of the coupling of the gate signal line supplying the gate signal Scan1. According to this, since the transistor Tr2 becomes in the on state by a voltage Vgd between the gate and drain terminals of the transistor Tr2 and the voltage at the node n3 is lowered, a higher voltage Vgs can be applied to the transistor Tr2 as compared to the period between periods t1 and t2 in the comparative example of the embodiment.

In the embodiment, the pixel circuit 100 operates as described above during the period t4 arranged before the period t1, and the pre-activate period for setting the transistor Tr2 to be in the on state can be thereby realized. According to the pre-activate period, even if the previous frame is a black image, the state of the transistor Tr2 (untrapped state) based on the frame can be resolved, and a current of substantially the same level as that of the second and subsequent frames can be made to flow through the transistor Tr2 in the first frame of white display (in other words, the degradation in luminance in the first frame of white display can be suppressed).

A Scan circuit and an EM circuit to realize the gate signals Scan1 to Scan3 and the control signal EM in the comparative example of the embodiment will be simply described with reference to FIG. 16.

The Scan circuit is a circuit for outputting the gate signals Scan1 to Scan3, and includes a shift register (hereinafter referred to as a Scan circuit shift register) composed of a plurality of registers (circuits). The Scan circuit operates such that the gate signals Scan1 to Scan3 are output from the registers provided in the respective stages of the Scan circuit shift register by inputting a start signal G1VST and clock signals G1CLK1 to G1CLK3 supplied according to a horizontal period (H) shown in FIG. 16 to the Scan circuit shift register. Incidentally, the gate signals Scan1 to Scan3 can be output in accordance with the timing at which the start signal G1VST and the clock signals G1CLK1 to G1CLK3 are switched from low to high, which are input to the Scan circuit shift register.

In addition, the EM circuit is a circuit for outputting the control signal EM, and includes a shift register (hereinafter referred to as an EM circuit shift register) composed of a plurality of registers (circuits). The EM circuit operates such that the control signal EM is output from the registers provided in the respective stages of the EM shift register by inputting a start signal E1VST and a clock signal E1CLK supplied according to the horizontal period (H) shown in FIG. 16 to the EM circuit shift register. Incidentally, the control signal EM can be output in accordance with the timing at which the start signal E1VST and the clock signal E1CLK1 are switched from low to high, which are input to the EM circuit shift register.

Figure 17:
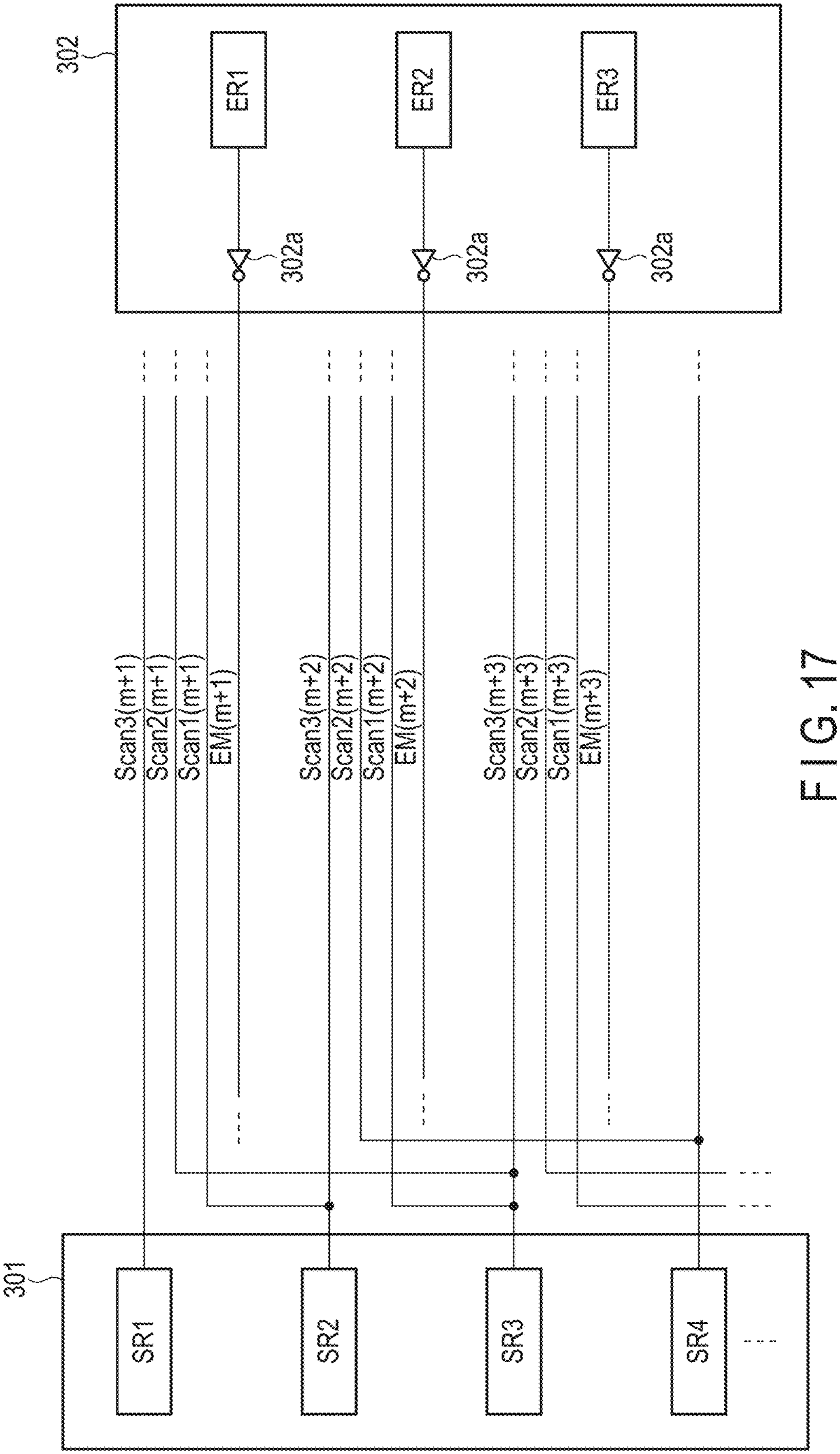
FIG. 17 is a chart showing an example of a configuration of a gate driver composed of a Scan circuit and an EM circuit.

In addition, FIG. 17 shows an example of a configuration of the gate driver composed of the Scan circuit and the EM circuit described above.

In the example shown in FIG. 17, a Scan circuit shift register 301 is composed of a plurality of registers including registers SR1 to SR4. Each of the registers SR1 to SR4 is connected to a gate signal line that is connected to (the pixel circuit 100 included in) the plurality of subpixels SP constituting each line of the display area DA, and the Scan circuit shift register 301 operates to sequentially output the gate signal Scan3 from each of the registers SRI to SR4.

More specifically, for example, when the register SR1 outputs the gate signal Scan3 to the plurality of subpixels SP constituting m+1 lines of the display area DA, the register SR2 outputs the gate signal Scan3 to the plurality of subpixels SP constituting m+2 lines of the display area DA after the gate signal Scan3 is output from the register SR1. Incidentally, the gate signal Scan3 output from the register SR2 is used as the gate signal Scan1 output to the plurality of subpixels SP constituting m+1 lines of the display area DA.

Furthermore, for example, when the register SR2 outputs the gate signal Scan3 to the plurality of subpixels SP constituting m+2 lines of the display area DA, the register SR3 outputs the gate signal Scan3 to the plurality of subpixels SP constituting m+3 lines of the display area DA after the gate signal Scan3 is output from the register SR2. Incidentally, the gate signal Scan3 output from the register SR3 is used as the gate signal Scan2 output to the plurality of subpixels SP constituting m+1 of the display area DA and the gate signal Scan1 output to the plurality of subpixels SP constituting m+2 of the display area DA.

In addition, in the example shown in FIG. 17, an EM circuit shift register 302 is composed of a plurality of registers including registers ER1 to ER3. Each of the registers ER1 to ER3 is connected to a NOT circuit (inverter) 302*a*, and each of the NOT circuits 302*a* is connected to a control signal line connected to (the pixel circuit 100 included in) the plurality of subpixels SP constituting each line of the display area DA. The EM circuit shift register 302 operates to sequentially output the control signals EM from the NOT circuits 302*a* connected to the respective registers ER1 to ER4.

According to the configuration of the gate driver shown in FIG. 17, the gate signals Scan1 to Scan3 and the control signal EM can be sequentially output for each of (the plurality of subpixels SP constituting) the lines of the display area DA.

Figure 16:
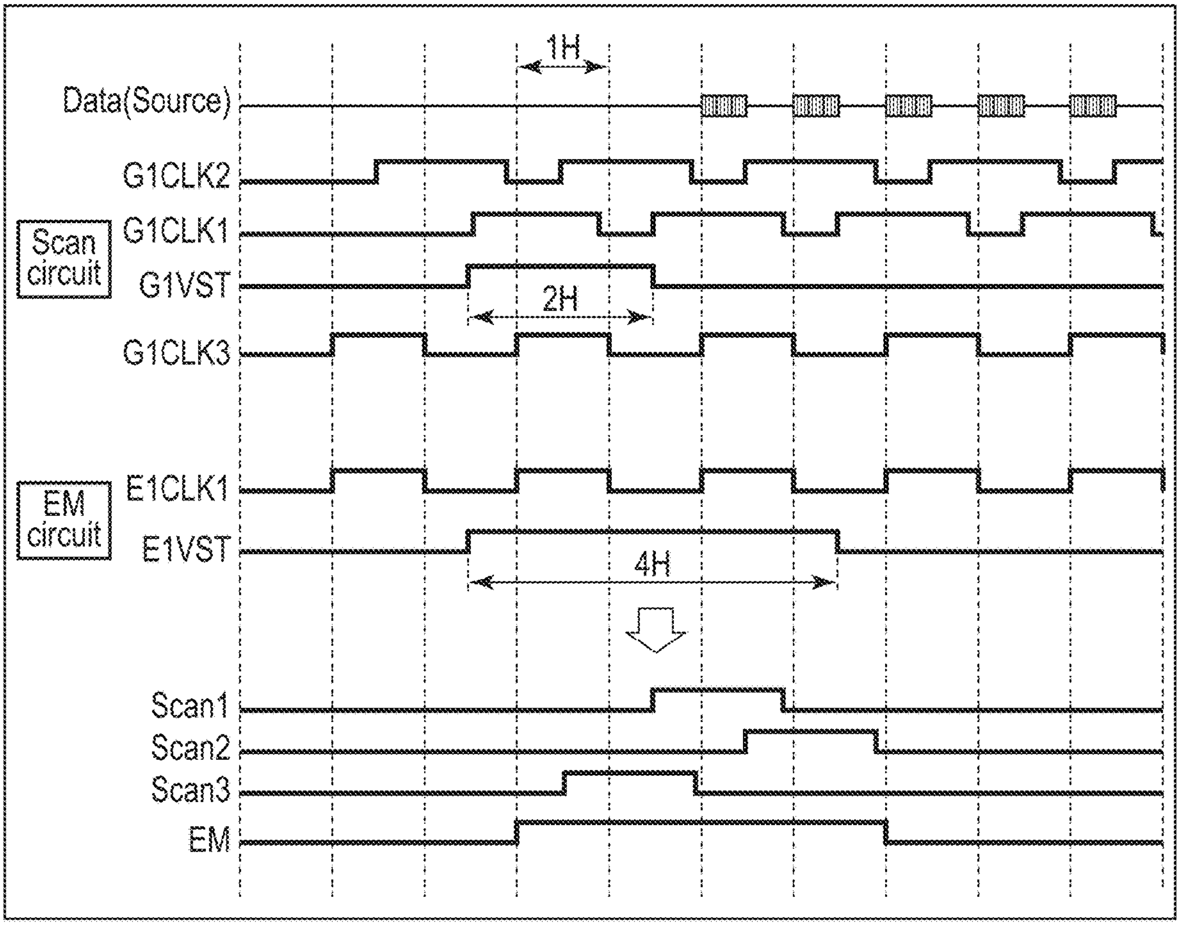
FIG. 16 is a chart illustrating a Scan circuit and an EM circuit to realize a fate signal and a control signal in the comparative example of the embodiment.
Figure 18:
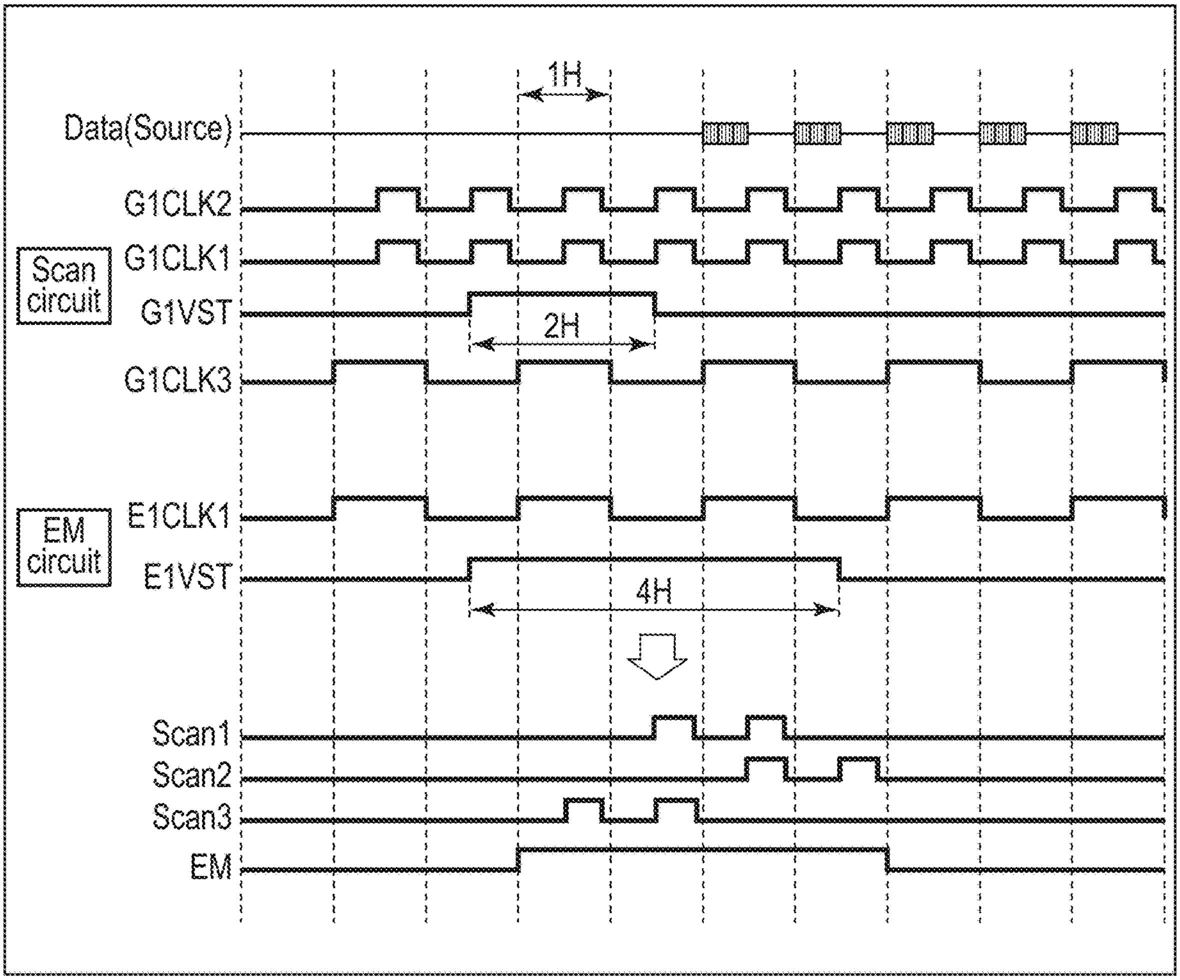
FIG. 18 is a chart illustrating a Scan circuit and an EM circuit to realize a gate signal and a control signal in the embodiment.

In the comparative example of this embodiment, it was explained that the gate signals Scan1 to Scan3 and the control signal EM are output from the Scan circuit and the EM circuit based on the start signal VST and the clock signals G1CLK1 to G1CLK3 shown in the above FIG. 16 and the start signal E1VST and the clock signal E1CLK1 However, in this embodiment, the gate signals Scan1 to Scan3 and the control signal EM are output from the Scan circuit and EM circuit based on the start signal VST and clock signals G1CLK1 to G1CLK3 shown in FIG. 18 and the start signal E1VST and clock signal E1CLK1. In this embodiment, the gate signals Scan1 and Scan2 are signals whose timing is formed by shifting the phase of the gate signal Scan3.

Incidentally, the gate signals Scan1 and Scan2 in the comparative example of the embodiment are signals whose timing is formed by shifting the phase of the gate signal Scan3. As shown in FIG. 15, the gate signals Scan1 and Scan2 in the embodiment are also handled as signals whose timing is formed by shifting the phase of Scan3. In addition, the control signal EM in the embodiment is the same as the control signal EM in the comparative example of the embodiment.

According to this, since the gate signals Scan1 to Scan3 and the control signal EM in the embodiment can be realized using the Scan circuit shift register 301 and the EM circuit shift register 302 (i.e., shift registers of one system) in the comparative example of the embodiment, the peripheral circuit width cannot be large in the embodiment as compared to the comparative example of the embodiment.

As described above, the display device DSP of the embodiment includes the base 10, the plurality of subpixels SP provided in the display area DA on the base 10, and the data signal lines that supply the data signal Data to each of the plurality of subpixels SP. Each of the plurality of subpixels SP includes a pixel circuit 100 having a transistor Tr2 (first transistor) and a storage capacitor Cst, and a light emitting element 20 driven by the pixel circuit 100. The storage capacitor Cst is configured such that the voltage that controls the current supplied to the light emitting element 20 is written to the storage capacitor Cst. The transistor Tr2 is configured to supply a current to the light emitting element 20, based on the voltage written to the storage capacitor Cst. The period for displaying one frame (image) in the display area DA includes a pre-activate period (second period) for setting the transistor Tr2 in the on state, which is provided before the sampling period (first period) for writing a voltage corresponding to the data signal Data to the storage capacitor Cst.

In the embodiment, the degradation in display quality of the display device DSP can be suppressed by the above-described configuration. More specifically, in the comparative example of the embodiment, when the black display is switched to the white display, the sampling in the first frame of the white display progresses faster than that in the second frame and subsequent frames (in other words, the sampling at the first white write is faster than that at the other white writes), and the luminance in the first frame is therefore degraded. In the embodiment, however, by setting the transistor Tr2 in the on state during the pre-activate period before the sampling period included in one frame period for displaying the first frame of the white display (in other words, presetting the transistor Tr2 in the trapped state by flowing a current to the transistor Tr2 in advance), the magnitude of the current flowing to the transistor Tr2 during the sampling period can be made to be the same as that in the second frame. Therefore, the difference in luminance between the first frame of the white display and the second and subsequent frames can be reduced (in other words, the black and white response can be improved and the degradation in display quality can be suppressed).

In other words, in the comparative example of this embodiment, the current flowing through transistor Tr2 increases in the first frame when switching from black to white display, resulting in a decrease in the brightness of that first frame. In this embodiment, however, a pre-activate period is placed before the sampling period in each frame period, so that even if the previous frame is a black image or a white image, the sampling period in each frame period is the same. Activation period is placed before the sampling period in each frame period, it is possible to align the magnitude of the current flowing through transistor Tr2 (in other words, the progress of the sampling) in the sampling period included in each frame period, regardless of whether the previous frame is a black image or a white image.

Incidentally, in the embodiment, it has been described that the one frame period includes the reset period (fourth period) for resetting the voltage written to the storage capacitor Cst, based on the power supply voltage VSH (first voltage) and the initialization voltage Vini (second voltage) and that the pre-activate period is arranged between the reset period and the sampling period. The pre-activate period may be arranged, for example, between the light emission period (third period) included in one frame period before the above one frame period and the sampling period included in one frame period including the pre-activate period (i.e., after the light emission period and before the sampling period).

In addition, the pixel circuit 100 in the embodiment further includes the transistor Tr3 (the second transistor), and the second terminal (one of the source terminal and the drain terminal) of the transistor Tr3 is connected to the second terminal (one of the source terminal and the drain terminal) of the transistor Tr2, and the first terminal (the other of the source terminal and the drain terminals) of the transistor Tr3 is connected to the gate terminal of the transistor Tr2 and the second terminal (one of the terminals) of the storage capacitor Cst. In addition, the power supply voltage VSH is supplied to the second terminal of the storage capacitor Cst, and the initialization voltage Vini is supplied to the first terminal (the other terminal) of the storage capacitor Cst. The transistor Tr3 becomes the on state during the reset period and the sampling period, and becomes the off state during the pre-activate period. In the embodiment, the pre-activate period can be inserted into one frame period by this configuration.

Second Embodiment

Next, a second embodiment will be described. In the above-described first embodiment, it has been described that the voltage of the source terminal and the drain terminal of the transistor Tr2 is lowered below the gate voltage by setting the transistor Tr3 in the off state during the pre-activate period. If the magnitude of Vgs applied during the pre-activate period is not sufficient, the degree of improvement in black and white response may be small.

Therefore, in the embodiment, a configuration for further increasing the voltage Vgs applied to the transistor Tr2 during the pre-activate period described in the above-described first embodiment will be described.

Figure 19:
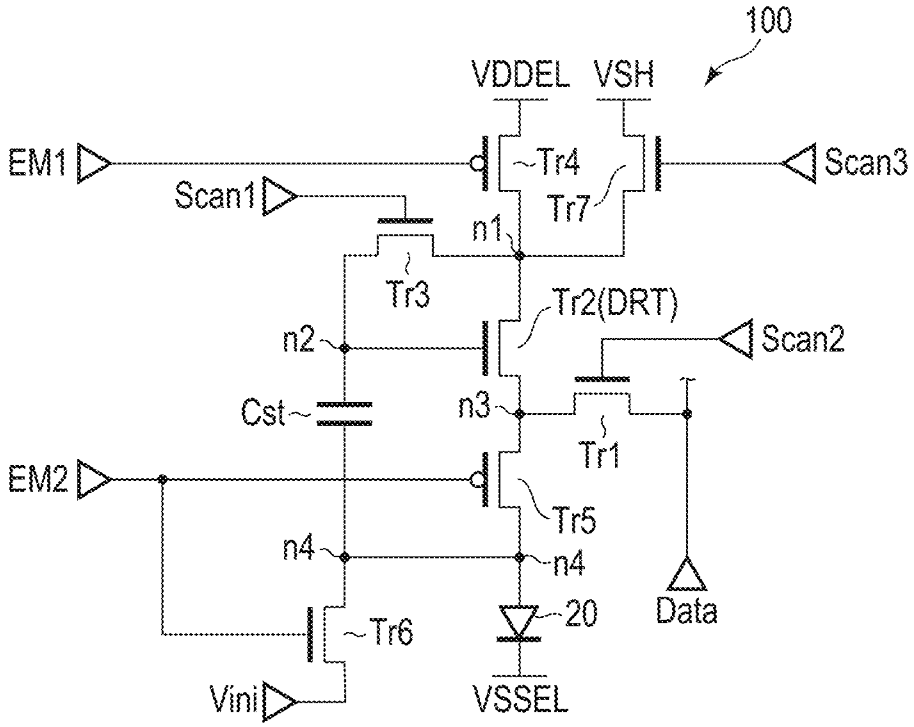
FIG. 19 is a view showing an example of a circuit configuration of a pixel circuit according to a second embodiment.

FIG. 19 is a view showing an example of a circuit configuration of a pixel circuit according to the embodiment. In FIG. 19, the same portions as those shown in FIG. 9 are denoted by the same reference numerals and their detailed descriptions are omitted, and portions different from those in FIG. 9 are mainly described.

In the above-described first embodiment, it has been described that the gate terminals of the transistors Tr4 to Tr6 are connected to a single control signal line (i.e., a control signal line supplying the control signal EM). In the embodiment, the control signal line is separated. More specifically, as shown in FIG. 19, the gate terminal of the transistor Tr4 is connected to a control signal line supplying the control signal EM1. In addition, the gate terminals of the transistors Tr5 and Tr6 are connected to the control signal line that supplies the control signal EM2.

Next, an example of the operation of the pixel circuit 100 according to the embodiment will be described below with reference to FIG. 20. Incidentally, portions different from those shown in FIG. 15 will be mainly described.

Figure 20:
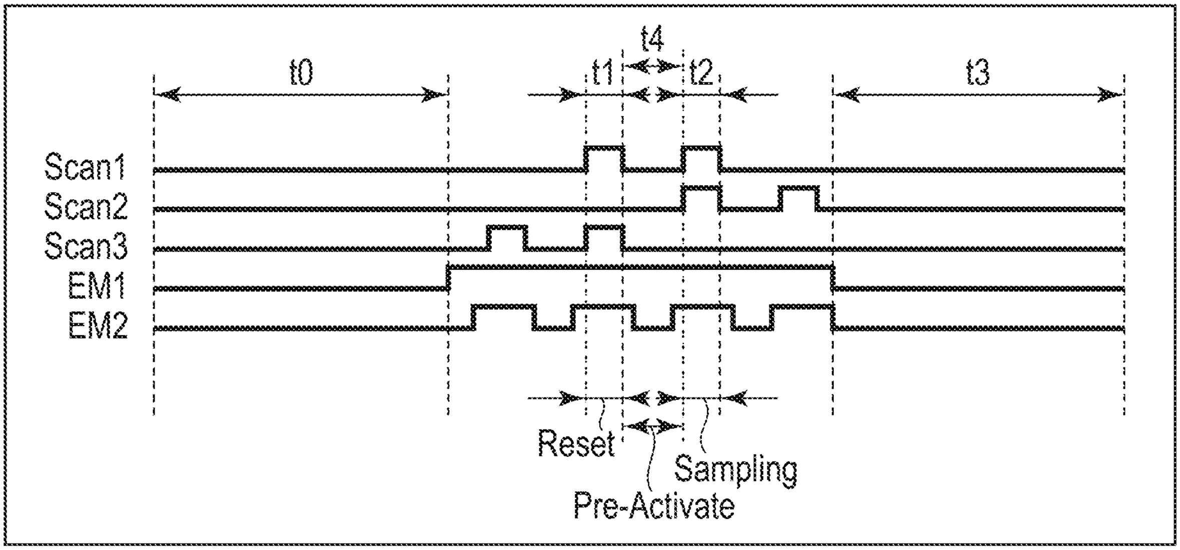
FIG. 20 is a chart illustrating an example of an operation of the pixel circuit according to a comparative example of the embodiment.

As shown in FIG. 20, since the control signal EM2 is switched from low to high before the period t1 starts, the transistor Tr5 is in the off state and the transistor Tr6 is in the on state during the period t1. According to this, the voltage of VSH-Vini is applied to the storage capacitor Cst as described above.

In addition, since the control signal EM2 is switched from high to low after the period t1 ends, the transistor Tr5 is in the on state and the transistor Tr6 is in the off state during the period t4.

According to the above-described control signal EM2, the transistors Tr6 and Tr5 becomes on state in order from the period t1 to the period t4. Therefore, in the embodiment, the initialization voltage Vini is supplied to the node n3 via the transistors Tr6 and Tr5 during the period t4. According to this, the voltages at the source and drain terminals of the transistor Tr2 can be lowered below the gate voltage due to the initialization voltage Vini supplied to the node n3.

In the above-described first embodiment, it has been described that the voltage Vgs is applied to the transistor Tr2 by coupling the gate signal line that supplies the gate signal Scan1 and the node n1 but, in the embodiment, the voltage Vgs is applied to the transistor Tr2 by the initialization voltage Vini as described above. Thus, the voltage Vgs applied to the transistor Tr2 in the embodiment becomes greater than the voltage Vgs applied to the transistor Tr2 in the above-described first embodiment.

Incidentally, the control signal EM1 in the embodiment is the same as the control signal EM in the embodiment, except for a feature of being supplied only to the transistor Tr4.

Figure 21:
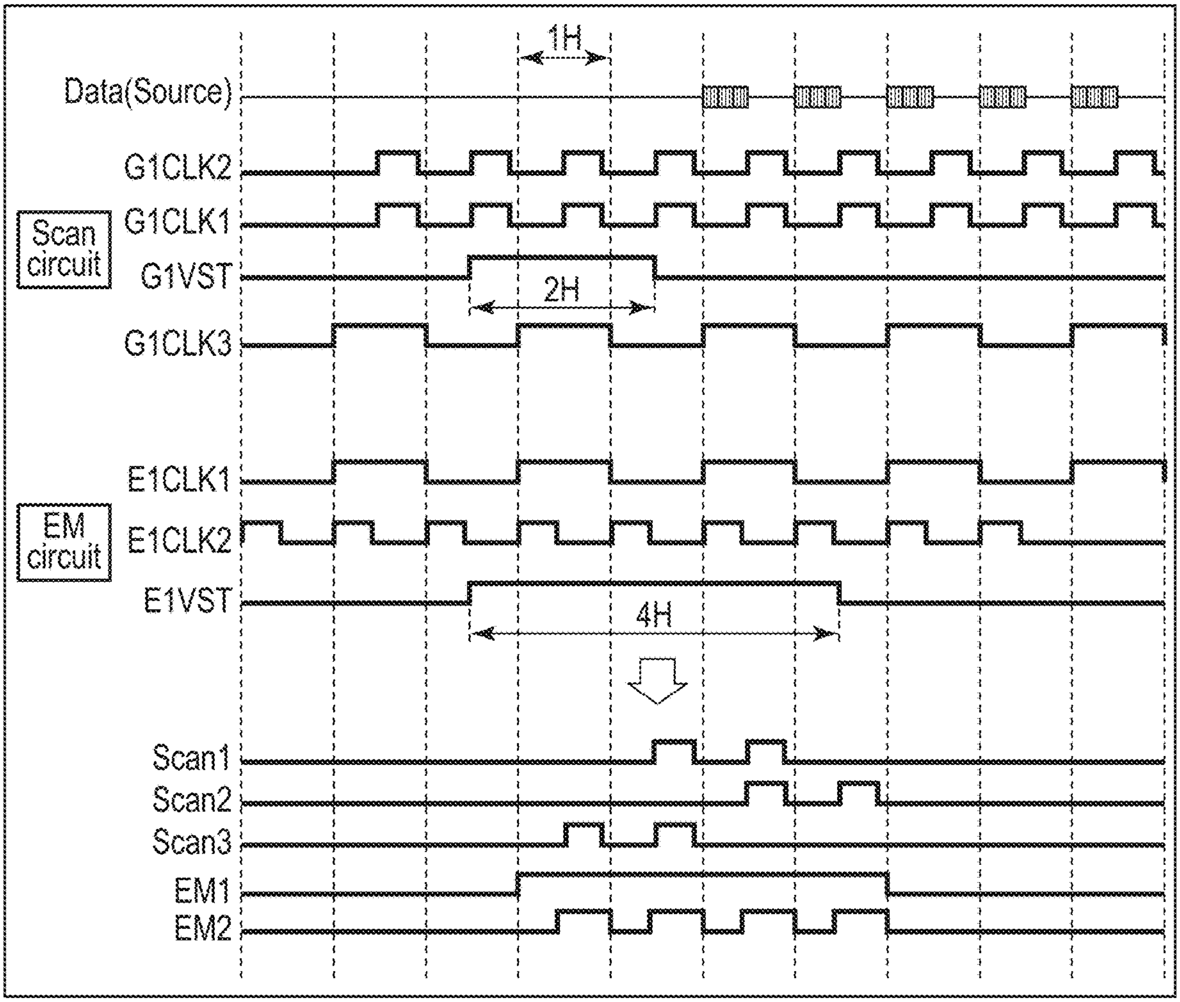
FIG. 21 is a chart illustrating a Scan circuit and an EM circuit to realize a gate signal and a control signal in the embodiment.

Incidentally, although detailed descriptions are omitted, the Scan circuit in the embodiment operates to output the gate signals Scan1 to Scan3, based on start signal G1VST and clock signals G1CLK1 to G1CLK3 shown in FIG. 21, similarly to the Scan circuit in the above-described first embodiment.

In contrast, unlike the EM circuit in the above-described first embodiment, the EM circuit in the embodiment operates to output the control signals EM1 and EM2, based on a start signal E1VST and clock signals E1CLK1 and E1CLK2 shown in FIG. 21.

Figure 22:
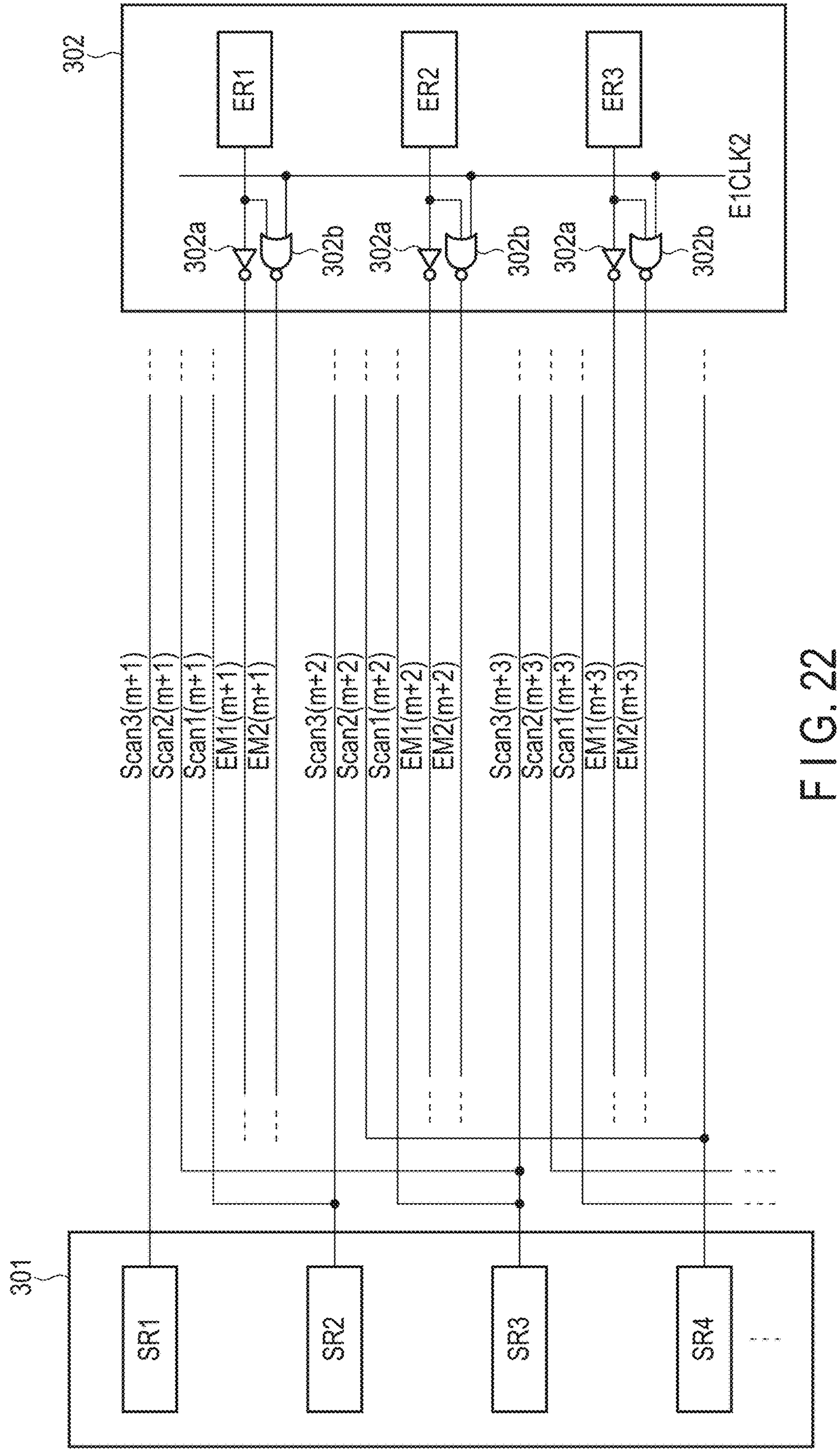
FIG. 22 is a chart showing an example a configuration of a gate driver composed of a Scan circuit and an EM circuit.

In addition, the EM circuit shift register 302 in the embodiment is configured to output the control signals EM1 from the NOT circuits 302*a* connected to the respective registers ER1 to ER3, and to output the control signals EM2 from NOR circuits 302*b*, which are connected to the respective registers ER1 to ER3 and to the signal line supplying the clock signal E1CLK2, as shown in FIG. 22.

In other words, in the embodiment, the control signals EM1 and EM2 can be realized by adding a simple circuit element in which a simple circuit element composed of one signal line supplying a clock signal and one NOR circuit (terminal) is added to the EM circuit (EM circuit shift register 302) in the above-described first embodiment.

As shown in FIG. 22, the Scan circuit shift register 301 in the embodiment is the same as the Scan circuit shift register 301 shown in FIG. 17, and does not need to be changed.

As described above, in the embodiment, the initialization voltage Vini is supplied to the first terminal of the transistor Tr2 during the pre-activate period.

Incidentally, in order to realize supplying the initialization voltage Vini to the first terminal of the transistor Tr2 during the pre-activate period in the embodiment, the on-state and off-state of the transistor Tr4 (third transistor) provided between the power supply line supplying the power supply voltage VDDEL (third voltage) and the node n1 are controlled based on the control signal EM1 (first control signal), and the transistor Tr5 (fourth transistor) provided between the nodes n3 and n4 and the transistor Tr6 (fifth transistor) provided between the power line supplying the initialization voltage Vin and the node n4 are controlled based on the control signal EM2 (second control signal).

In this case, the transistor Tr4 is controlled to be in the off state during the reset period, the pre-activate period, and sampling period, and in the on state during the emission period. The transistor Tr5 is controlled to be in the off state during the reset period and the sampling period, and in the on state during the pre-activate period and the light emission period. The transistor Tr6 is controlled to be in the off state during the pre-activate period and the light emission period, and in the on state during the reset period and the sampling period.

In the embodiment, since the voltage Vgs applied to the transistor Tr2 can be increased as compared to the above-described first embodiment, by the above-described configuration, the black and white response can be further improved.

All display devices, which are implementable with arbitrary changes in design by a person of ordinary skill in the art based on the display device described above as the embodiments of the present invention, belong to the scope of the present invention as long as they encompass the spirit of the present invention.

Various modifications are easily conceivable within the category of the idea of the present invention by a person of ordinary skill in the art, and these modifications are also considered to belong to the scope of the present invention. For example, additions, deletions or changes in design of the constituent elements or additions, omissions or changes in condition of the processes may be arbitrarily made to the above embodiments by a person of ordinary skill in the art, and these modifications also fall within the scope of the present invention as long as they encompass the spirit of the present invention.

In addition, the other advantages of the aspects described in the above embodiments, which are obvious from the descriptions of the specification or which are arbitrarily conceivable by a person of ordinary skill in the art, are considered to be achievable by the present invention as a matter of course.

What is claimed is:

1. A display device comprising:
a base;
a plurality of pixels provided in a display area on the base;
a data signal line supplying a data signal to each of the plurality of pixels;
a first power supply line for supplying a first voltage to each of the plurality of pixels; and
a second power supply line for supplying a second voltage to each of the plurality of pixels, wherein
each of the plurality of pixels includes;
  a pixel circuit having a first transistor, a second transistor, and a storage capacitor, and
  a light emitting element driven by the pixel circuit,
a voltage that controls a current supplied to the light emitting element is written to the storage capacitor,
the first transistor is configured to supply a current to the light emitting element, based on the voltage written to the storage capacitor,
one frame period for displaying one frame in the display area includes:
  a first period,
  a second period for setting the first transistor in an on state, which is provided before the first period, which is for writing a voltage corresponding to the data signal to the storage capacitor,
  a third period for supplying a current to the light emitting element, which is provided after the first period, and
  a fourth period for resetting a voltage written to the storage capacitor based on the first and second voltages supplied from the first and second power supply lines respectively,
the second period is between a third period included in one frame period before said one frame period and the first period included in said one frame period,
the second period is between the fourth period and the first period,
one of a source terminal and a drain terminal of the second transistor is connected to one of a source terminal and a drain terminal of the first transistor, the other of the source terminal and the drain terminal of the second transistor is connected to a gate terminal of the first transistor and a first terminal of the storage capacitor, the first voltage is supplied from the first power supply line to the first terminal of the storage capacitor, the second voltage is supplied from the second power supply line to a second terminal of the storage capacitor, and the second transistor becomes in an on state during the fourth period and the first period, and becomes in an off state during the second period.

2. The display device of claim 1, wherein the second voltage is supplied to one of a source terminal and a drain terminal of the first transistor during the second period.

3. The display device of claim 2, further comprising:

a third power supply line for supplying a third voltage to each of the plurality of pixels, wherein the pixel circuit includes third to fifth transistors, one of a source terminal and a drain terminal of the third transistor is connected to the third power supply line, the other of the source terminal and the drain terminal of the third transistor is connected to one of the source terminal and the drain terminal of the first transistor, one of a source terminal and a drain terminal of the fourth transistor is connected to the other of the source terminal and the drain terminal of the first transistor, the other of the source terminal and the drain terminal of the fourth transistor is connected to the light emitting element and one of a source terminal and a drain terminal of the fifth transistor, one of the source terminal and the drain terminal of the fifth transistor is further connected to the second terminal of the storage capacitor, the other of the source terminal and the drain terminal of the fifth transistor is connected to the second power supply line, the third transistor is in an off state during the fourth period, the second period, and the first period, and is in an on state during the third period, the fourth transistor is in an off state during the fourth period and the first period, and is in an on state during the second period and the third period, and the fifth transistor is in an off state during the second period and the third period, and is in an on state during the fourth period and the first period.

4. The display device of claim 3, further comprising:

a first control signal line for supplying a first control signal to each of the plurality of pixels; and a second control signal line for supplying a second control signal to each of the plurality of pixels, the off state and the on state of the third transistor are controlled based on the first control signal, and the off state and the on state of the fourth and fifth transistors are controlled based on the second control signal.

* * * * *